United States Patent
Friedhoff et al.

(10) Patent No.: US 7,672,530 B2
(45) Date of Patent: Mar. 2, 2010

(54) METHOD AND SYSTEM FOR IDENTIFYING ILLUMINATION FLUX IN AN IMAGE

(75) Inventors: Richard Mark Friedhoff, New York, NY (US); Bruce Allen Maxwell, Springfield, PA (US); Casey Arthur Smith, Ithaca, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 1071 days.

(21) Appl. No.: 11/341,742

(22) Filed: Jan. 27, 2006

(65) Prior Publication Data

US 2006/0177149 A1    Aug. 10, 2006

Related U.S. Application Data

(60) Provisional application No. 60/648,228, filed on Jan. 27, 2005, provisional application No. 60/650,300, filed on Feb. 3, 2005.

(51) Int. Cl.
*G06K 9/40* (2006.01)

(52) U.S. Cl. .................. 382/266; 382/260; 382/274; 382/275; 358/3.26; 358/3.27; 358/463

(58) Field of Classification Search ............... 382/260, 382/266, 274, 275
See application file for complete search history.

(56) References Cited

U.S. PATENT DOCUMENTS

| | | | |
|---|---|---|---|
| 4,685,071 A | 8/1987 | Lee | 364/526 |
| 5,495,536 A | 2/1996 | Osbourn | 382/199 |
| 5,638,465 A * | 6/1997 | Sano et al. | 382/281 |
| 5,651,042 A | 7/1997 | Dewaele | 378/62 |
| 6,005,683 A | 12/1999 | Son et al. | 358/488 |
| 6,037,976 A | 3/2000 | Wixson | 348/122 |
| 6,061,091 A | 5/2000 | Van de Poel et al. | 348/241 |
| 6,349,113 B1 | 2/2002 | Mech et al. | 375/240.08 |
| 6,428,169 B1 | 8/2002 | Deter et al. | 353/20 |
| 6,462,772 B1 * | 10/2002 | Bryant | 348/96 |
| 6,483,561 B2 * | 11/2002 | Maruyama et al. | 349/112 |
| 6,741,306 B2 * | 5/2004 | Maruyama et al. | 349/112 |
| 6,741,753 B1 * | 5/2004 | Moroney | 382/274 |
| 7,031,525 B2 | 4/2006 | Beardsley | 382/199 |
| 7,088,392 B2 | 8/2006 | Kakarala et al. | 348/272 |
| 7,103,227 B2 | 9/2006 | Raskar et al. | 382/266 |
| 7,206,449 B2 | 4/2007 | Raskar et al. | 382/199 |
| 2005/0212794 A1 | 9/2005 | Furukawa et al. | 345/419 |

OTHER PUBLICATIONS

K. Barnard, G.D. Finlayson and B. Funt, *Color Constancy for Scenes with Varying Illumination*, Computer Vision and Image Understanding, Feb. 1997, 65(2):311-321.

(Continued)

*Primary Examiner*—Yosef Kassa
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method is provided for determining an illumination boundary in an image. The method comprises the steps of performing dynamic sampling in preselected local areas of the image to determine spectral ratio information for the image at each of the preselected local areas, and utilizing the spectral ratio information to identify an illumination boundary.

40 Claims, 19 Drawing Sheets

Identifying Local Spectral Ratio Using Nth-order Token Matching

OTHER PUBLICATIONS

H.G. Barrow and J.M. Tenenbaum, *Recovering Intrinsic Scene Characteristics from Image*, Computer Vision and Image Understanding, 1978, 2-26.

C.F. Borges, *A Trichromatic Approximation Method for Surface Illumination*, Journal of Optical Society of America, Aug. 1991, 8(8): 1319-1323.

M.S. Drew, G.D. Finlayson and S.D. Horley, *Recovery of Chromaticity Image Free From Shadows Via Illumination Invariance*, Proceedings of IEEE Workshop on Color and Photometric Methods in Computer Vision, Nice, France 2003.

G.D. Finlayson, M.S. Drew and L. Cheng, *Intrinsic Images By Entropy Minimization*, Proceedings of European Conference on Computer Vision, LNCS 3023, pp. 582-595, 2004.

G.D. Finlayson, S.D. Horley and M.S. Drew, *Removing Shadows From Images*, Proceeding of European Conference on Computer Vision, pp. 823-826, London, UK, 2002.

G.D. Finlayson, S.D. Horley and M.S. Drew, *On The Removal Of Shadows From Images*, IEEE. Translation on Patter n Analysis and Machine Vision, 28(1): 59-68, 2006.

G.D. Funklea and R. Bajcsy, *Combining Color and Geometry For the Active, Visual Recognition of Shadows*, University of Pennsylvania Department of Computer & Information Science Technical Report No. MS-CIS-94-62.

R. Gershon, A.D. Jepson and J. K. Tsotsos, *Ambient Illumination and the Determination of Material Changes*, Journal of the Optical Society of America A, 3(10):1700-1707, 1986.

J.M. Geusebroek, R.v.d. Bommgard, A.W.M. Smeulders, *Color Invariance*, IEEE Trans. On Pattern Analysis and Machine Intelligence, 23(12):1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1):277-299, Dec. 1974.

G.J. Klinker, S.A. Shafer and T. Kanade, *A Physical Approach to Image Understanding*, Int'l Journal Of Computer Vision, 4(1): 7-38, Jan. 1990.

E.H. Land and J.J. McCann, *Lightness and Retinex Theory*, Journal of Optical Society Of America A, 61:1-11, 1971.

M.S. Langer, *When Shadows Become Interreflections,*, Int'l Journal of Computer Vision, 34(2/3), 193-204, 1999.

J.A. Marchant and C.M. Onyango, *Shadow-Invariant Classification for Scenes Illuminated by Daylight*, Journal of the Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Werman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14.

Elena Salvador et al.:"Cast shadow segmentation using invariant color features," Computer Vision and Image Understanding 95 (2004) 238-259.

Florica Mindru et al:"Moment invariants for recognition under changing viewpoint and illumination," Computer Vision and Image Understanding 94 (2004) 3-27.

Kobus Barnard and Graham Finlayson, Shadow Identification using Colour Ratios, Proceedings of the IS&T/SID Eighth Color Imaging Conference: Color Science, Systems and Applications, 2000, 97-101.

G.D. Funklea and R. Bajcsy, *Combining Color And Geometry For the Active, Visual Recognition of Shadows*, University of Pennsylvania Department of Computer & Information Science Technical Report No. MS-CIS-94-62, Sep. 2009.

J.v.d. Weijer and C. Schmid, *Coloring Local Feature Extraction*, pp. 1-14, Sep. 2009.

Theo Gevers et al.:"Classifying Color Edges in Video Into Shadow-Geometry, Highlight, or Material Transistions," IEEE Transactions on Multimedia, vol. 5, No. 2, Jun. 2003, pp. 237-243.

"Mean shift analysis and applications," Comaniciu, D.; Meer, P.; Computer Vision, 1999, The Proceedings of the Seventh IEEE International Conference on; vol. 2, Sep. 20-27, 1999; pp. 1197-1203.

\* cited by examiner

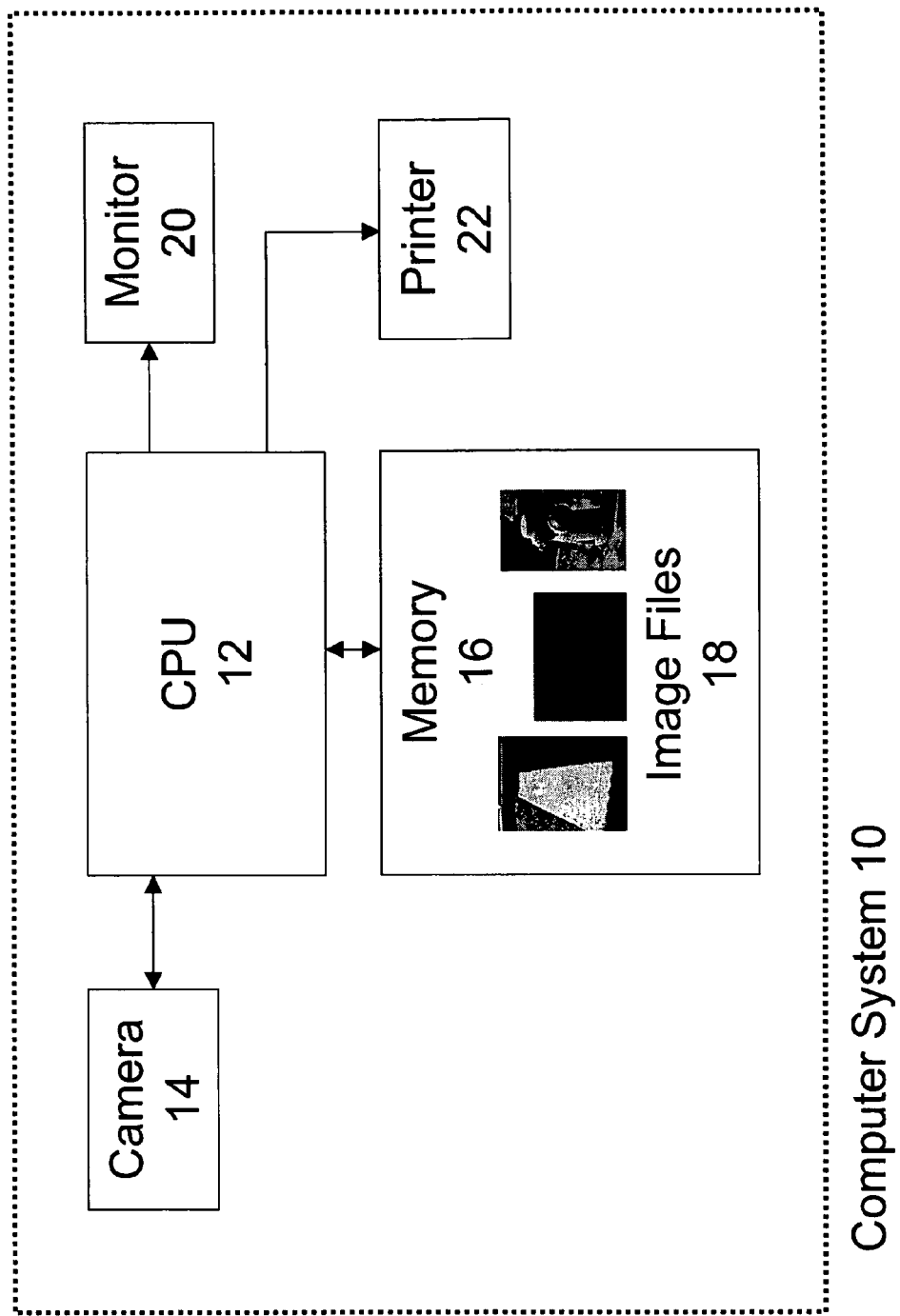
Figure 1: Computer System Configured to Operate on Images

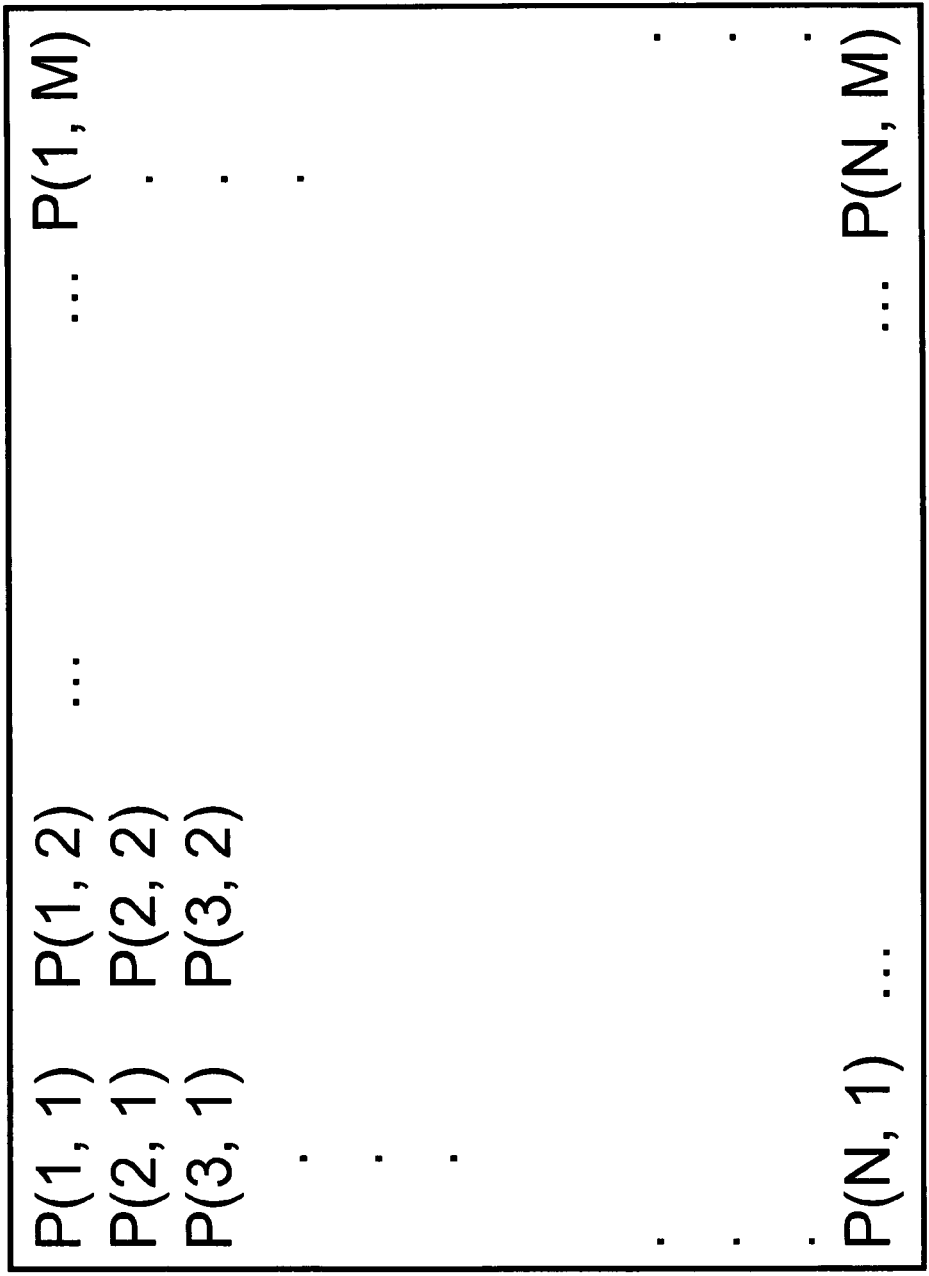
Figure 2: Pixel Array for Storing Image Data

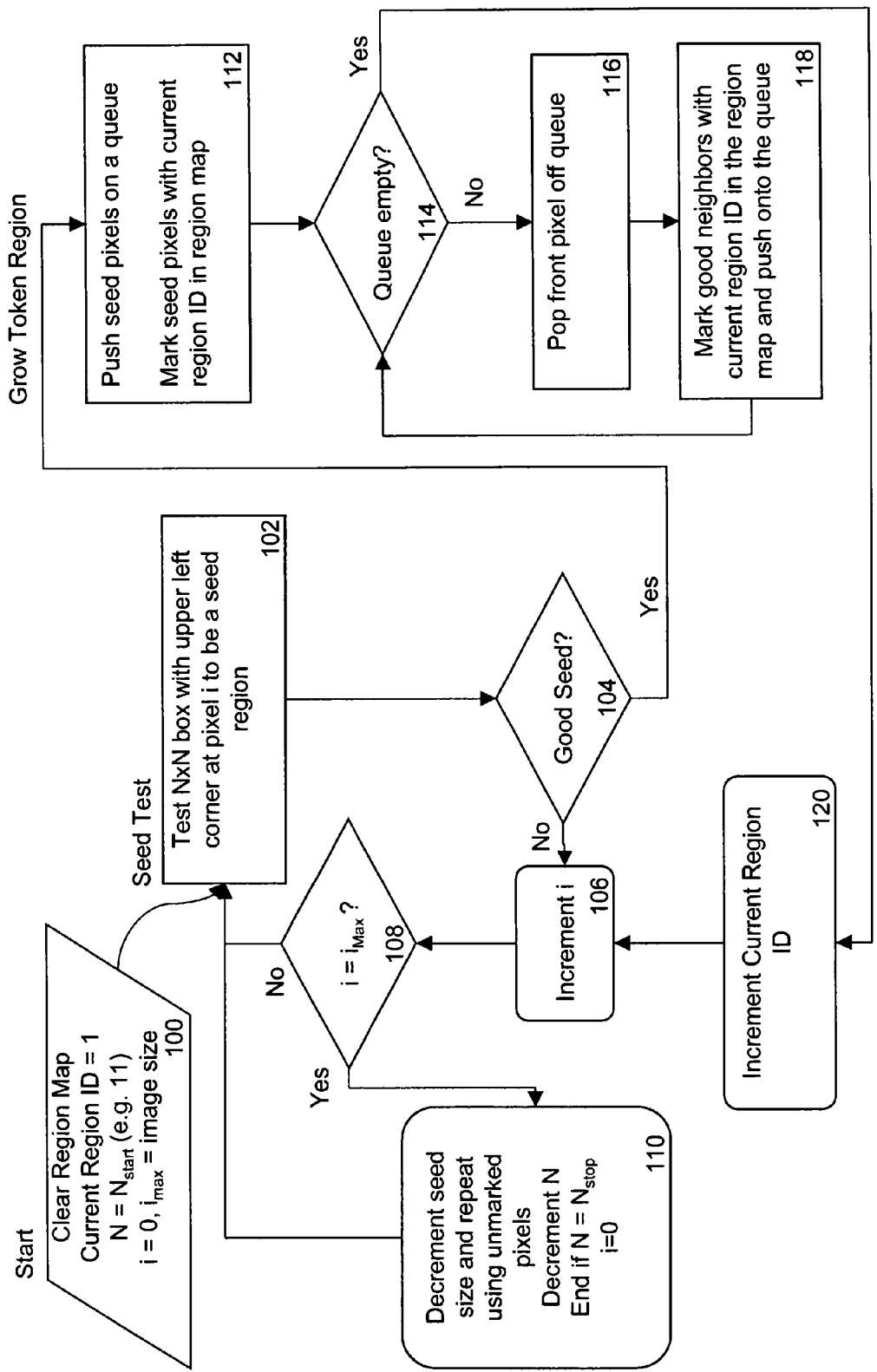
Figure 3A: Identifying Token Regions in an Image

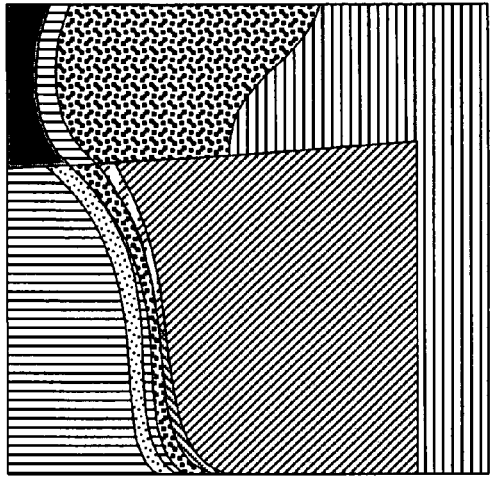
Figure 3C: Token Regions
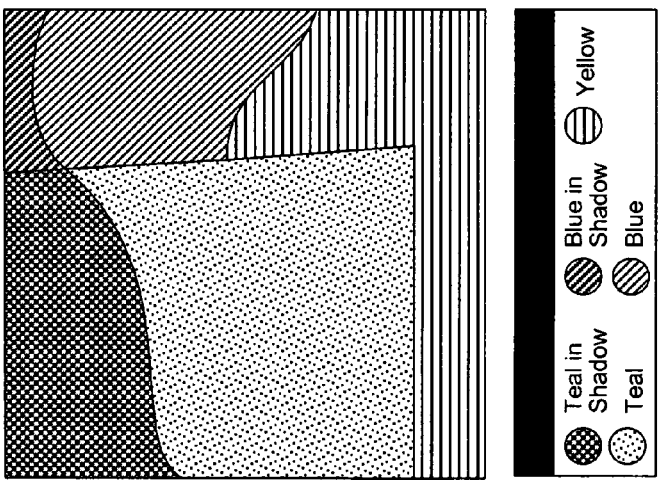
Figure 3B: Original Image
Figure 3B, 3C: Examples of Identifying Token Regions in an Image

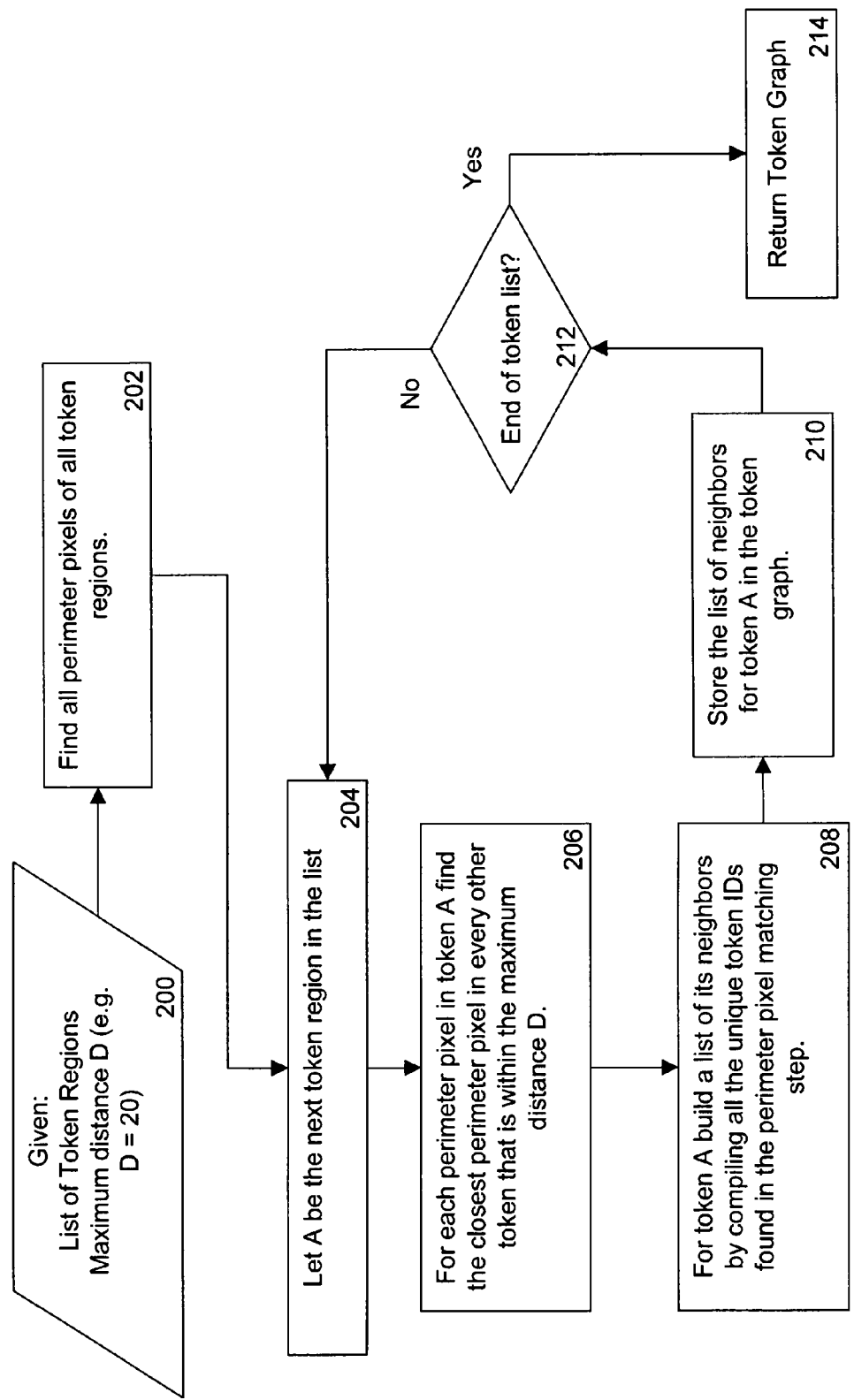
Figure 4A: Building a Token Graph

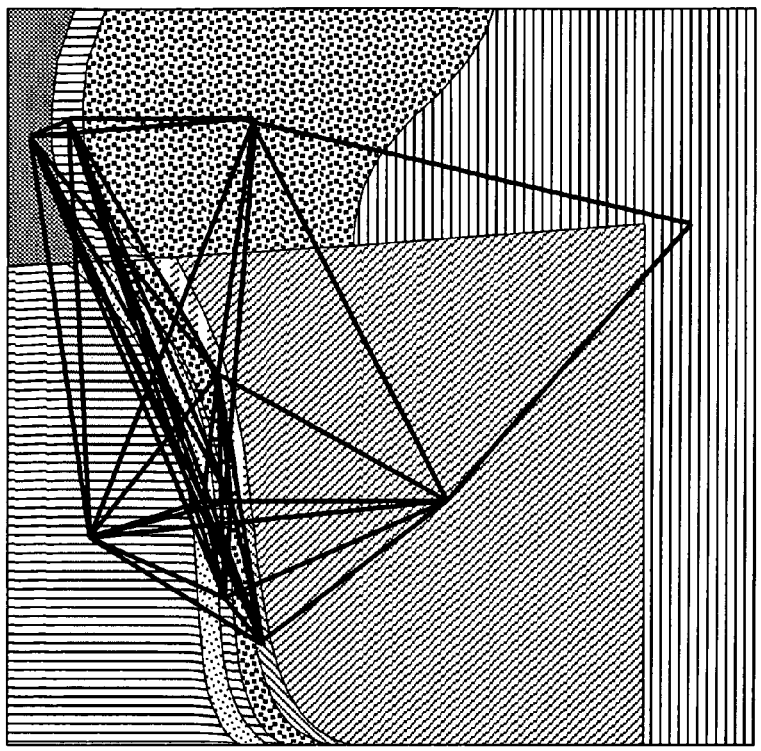
Figure 4C: Connections between tokens
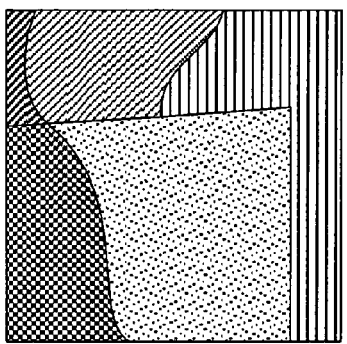
Original Image (from 3B)
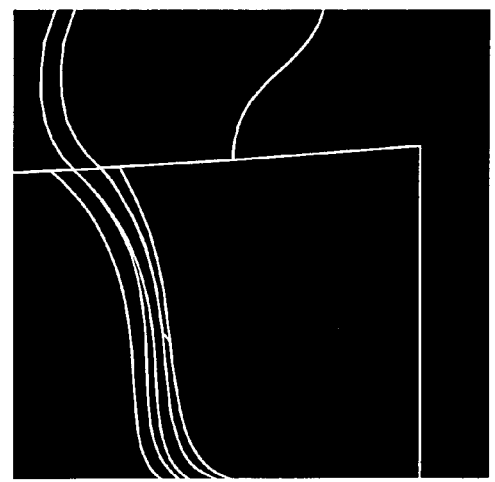
Figure 4B: Token Perimeters
Figure 4B, 4C: Building a Token Graph

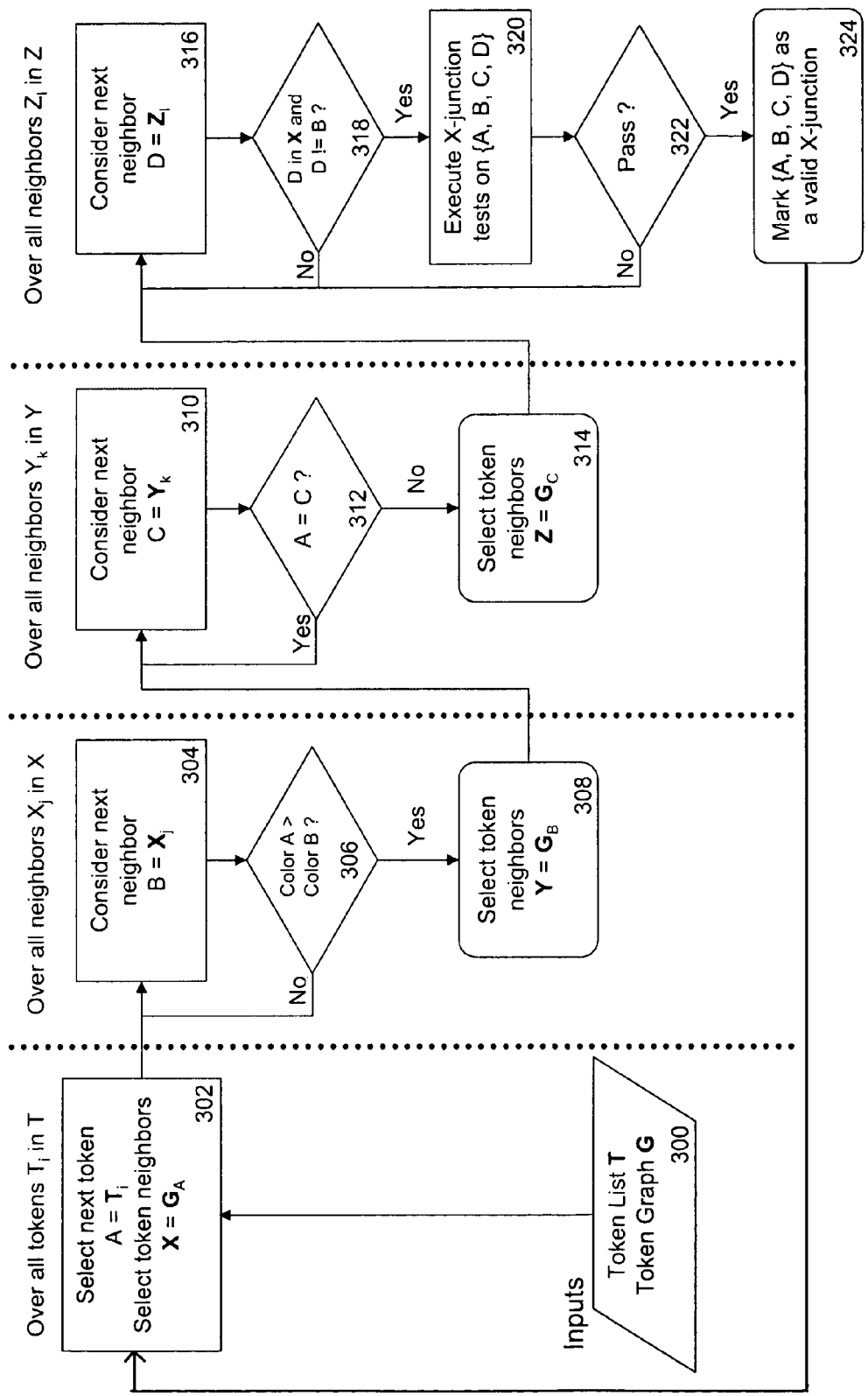
Figure 5A: Identifying X-Junctions Using a Token Region Graph

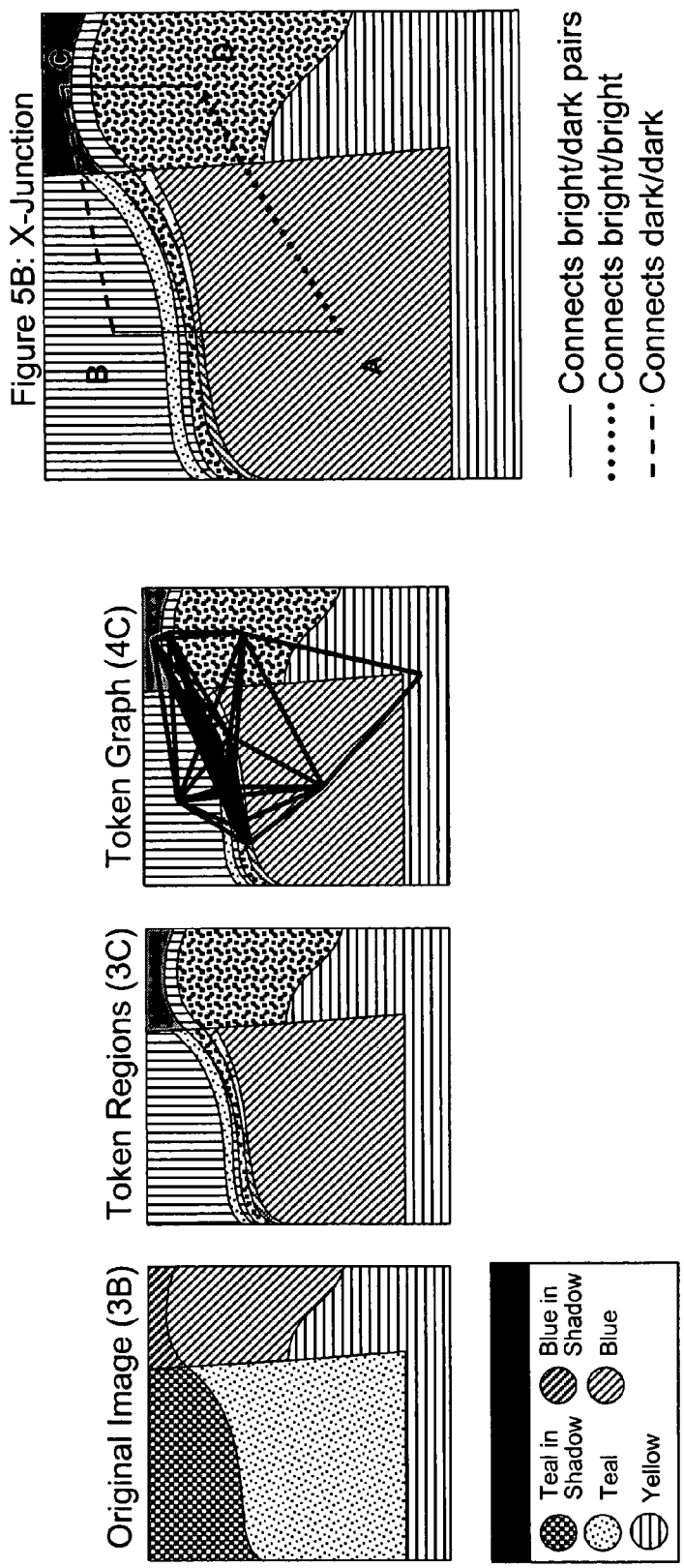
Figure 5B: Identifying X-Junctions Using a Token Region Graph

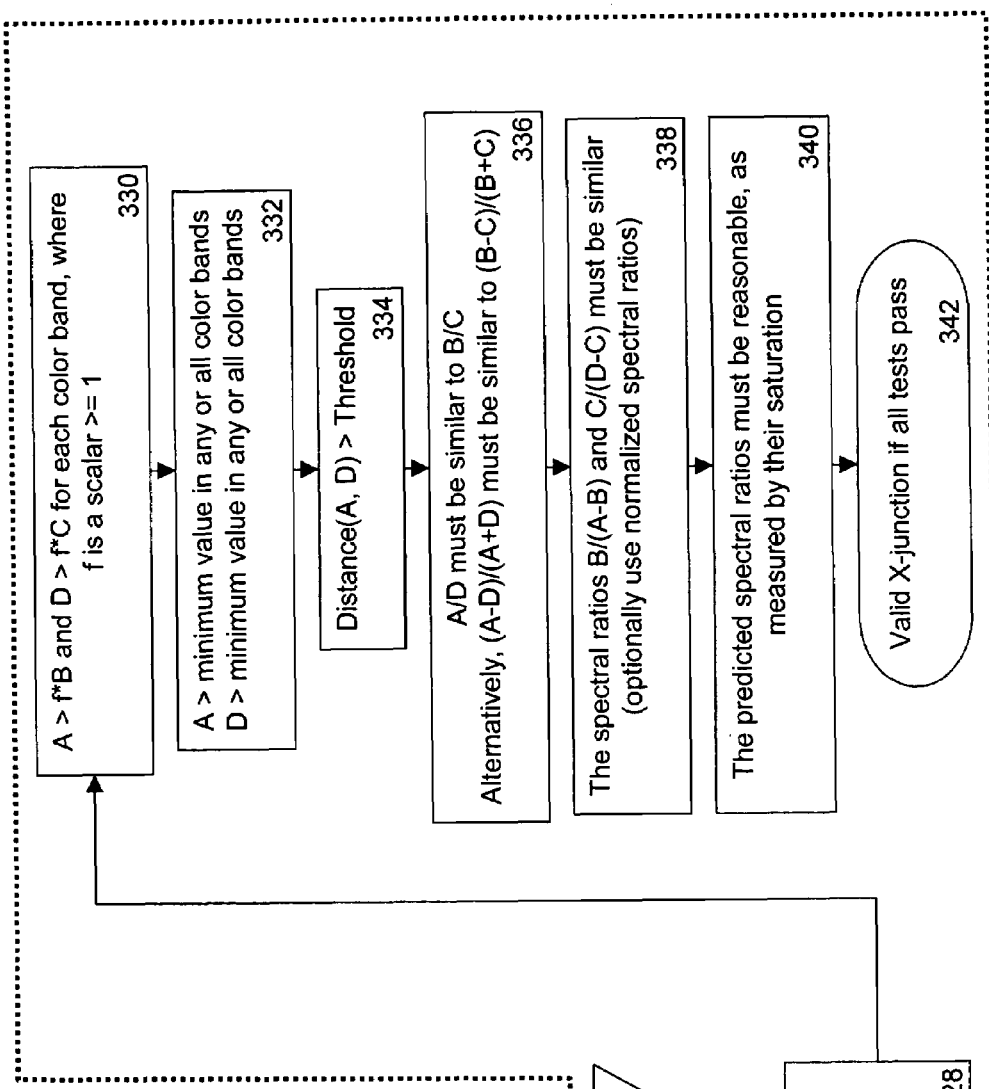
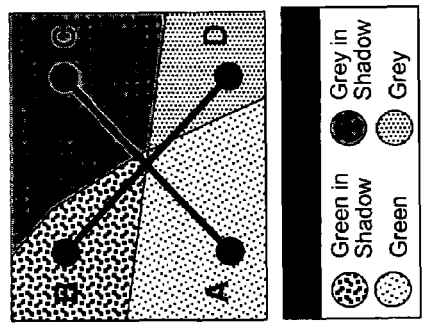
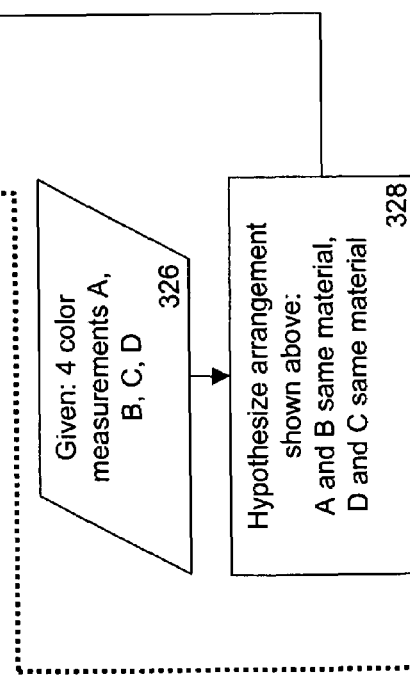
Figure 6A: X-junction tests 320
Figure 6B: Example X-junction
Figure 6A, 6B: X-junction Tests

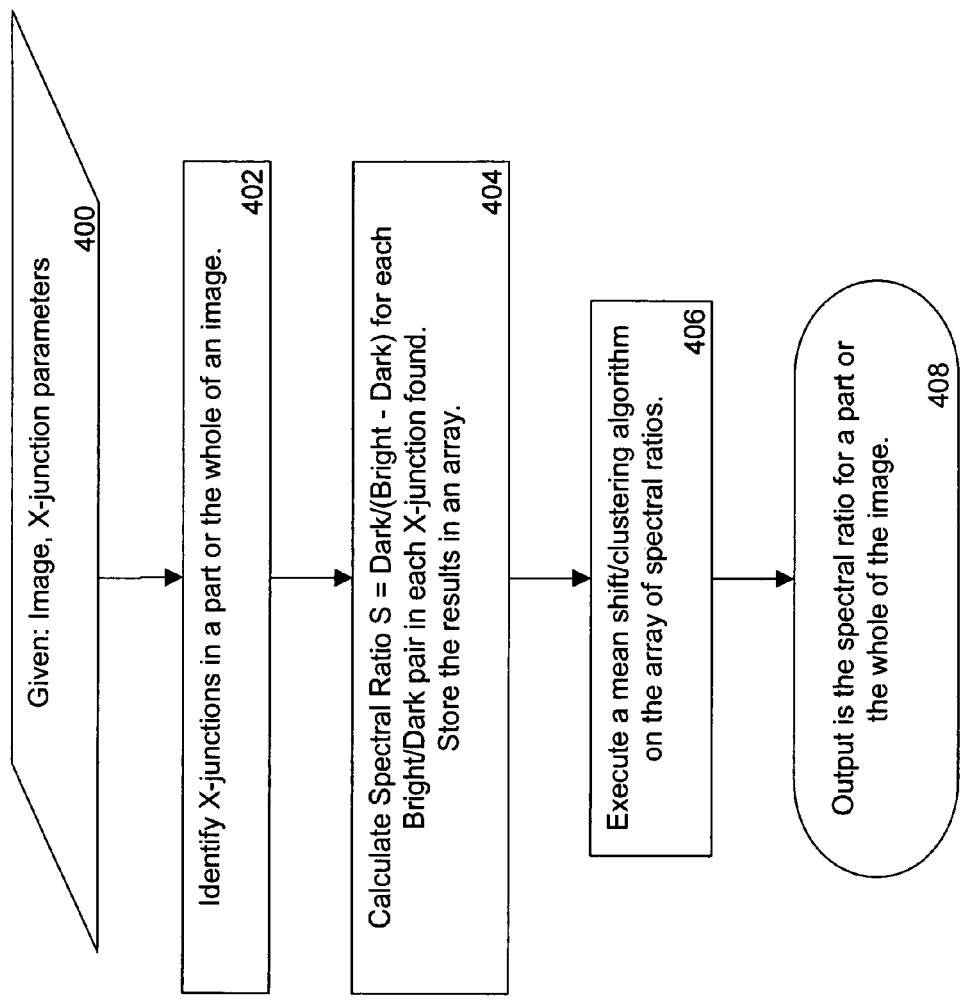
Figure 7: Identifying Local Spectral Ratio Using X-junctions

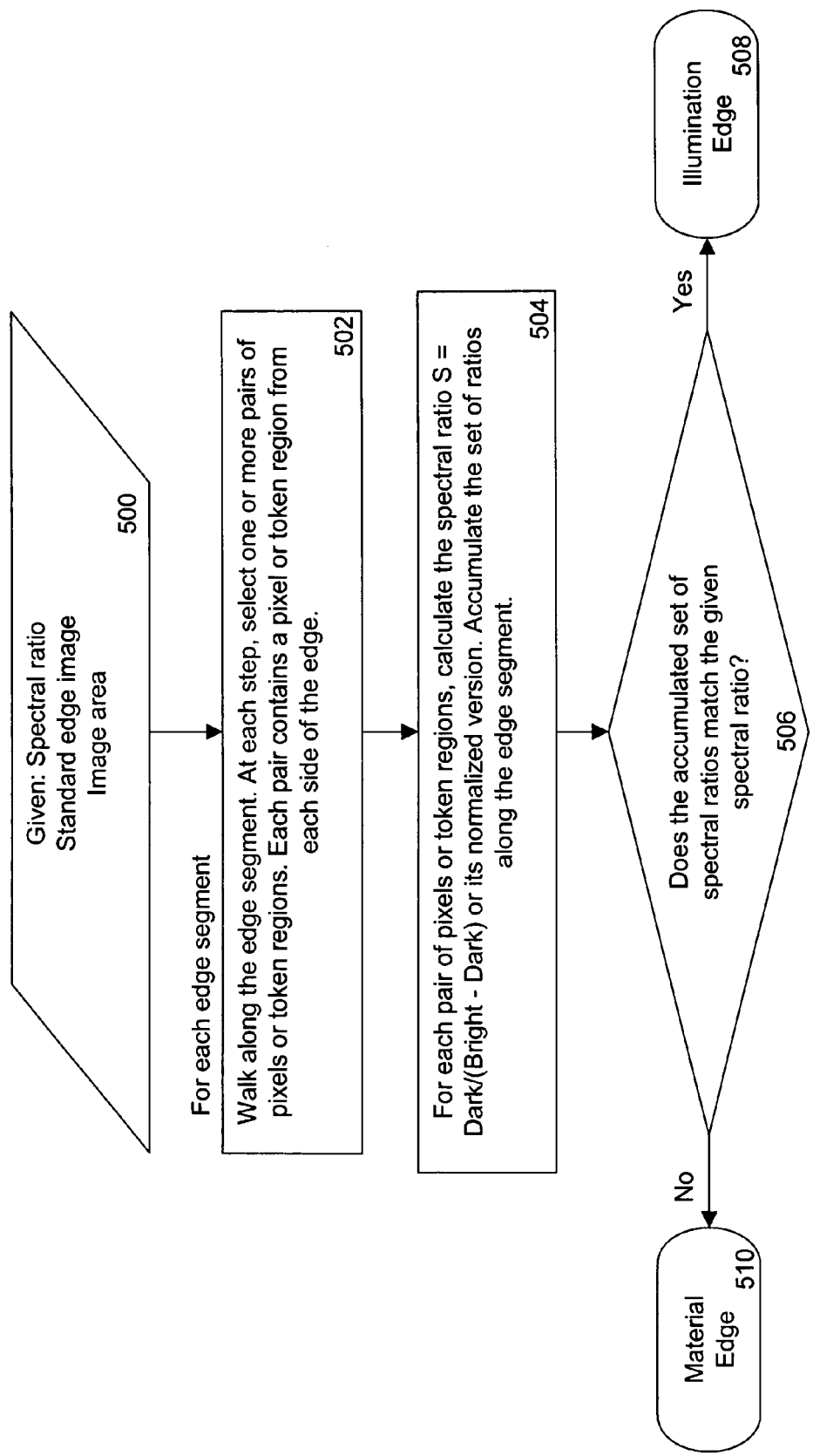
Figure 8: Identifying Local Material and Illumination Edges Using Ratio Matching

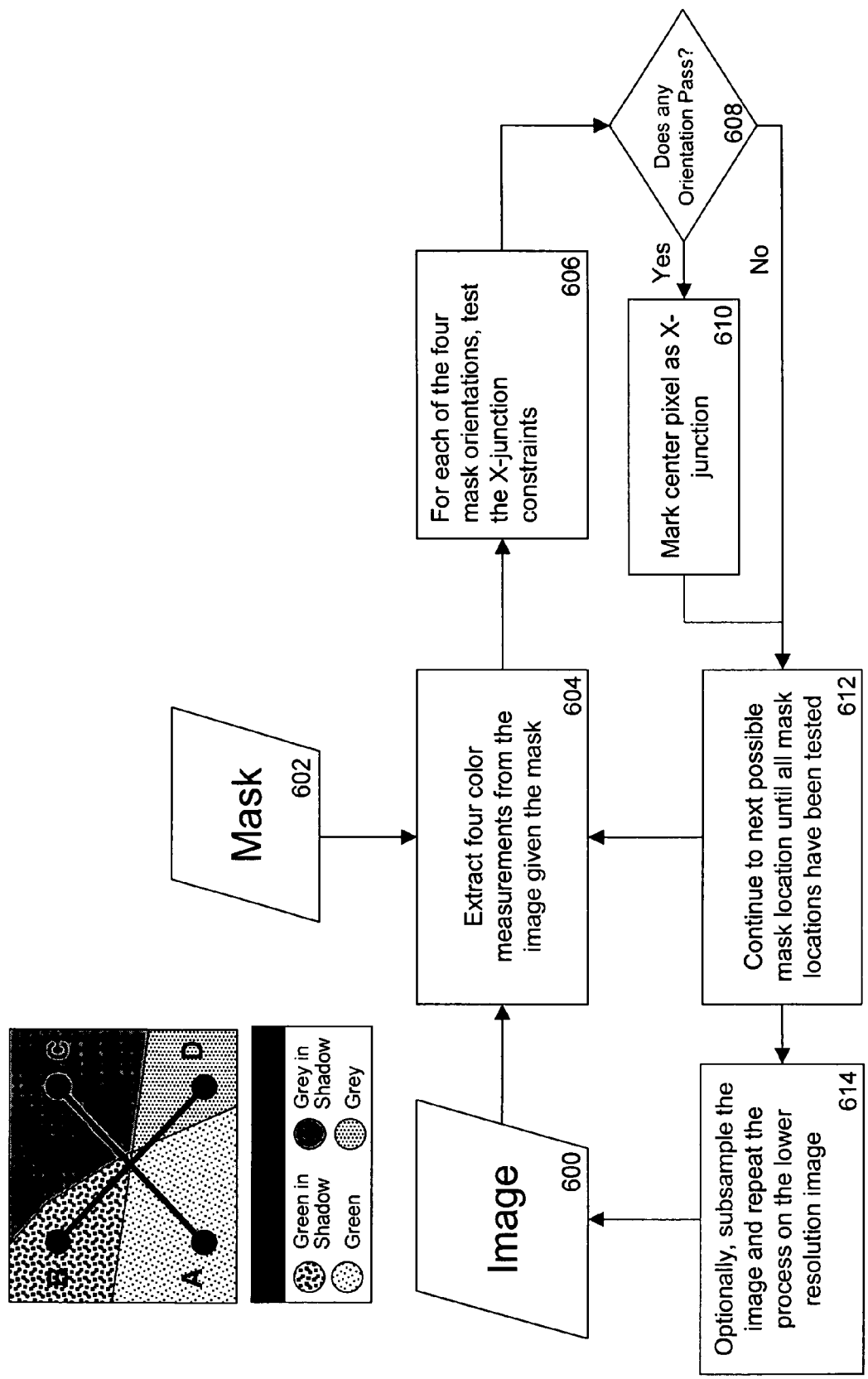
Figure 9: Identifying X-junctions in an Image Using a Fixed-size Mask

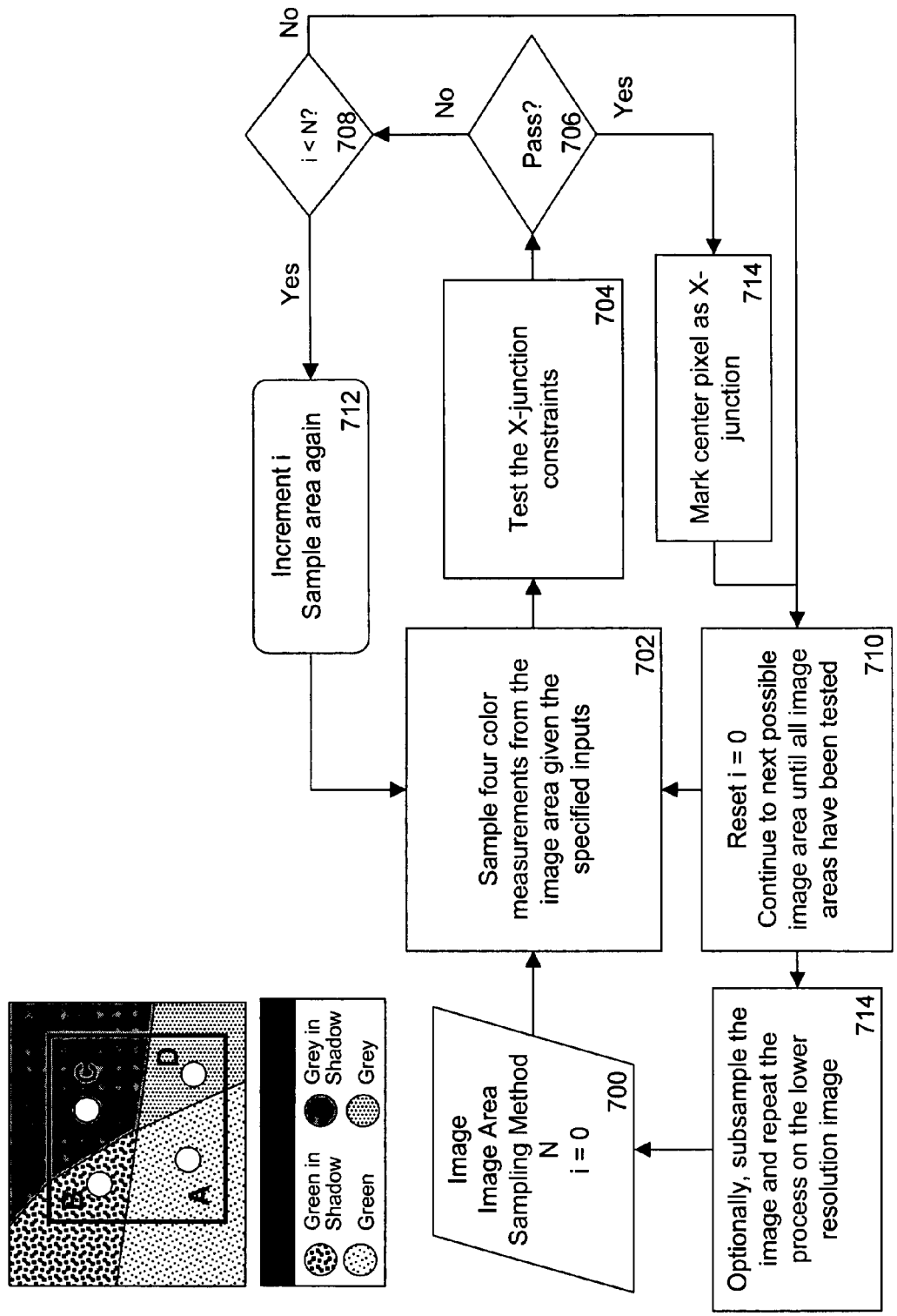
Figure 10: Identifying X-junctions in an Image Stochastic Sampling

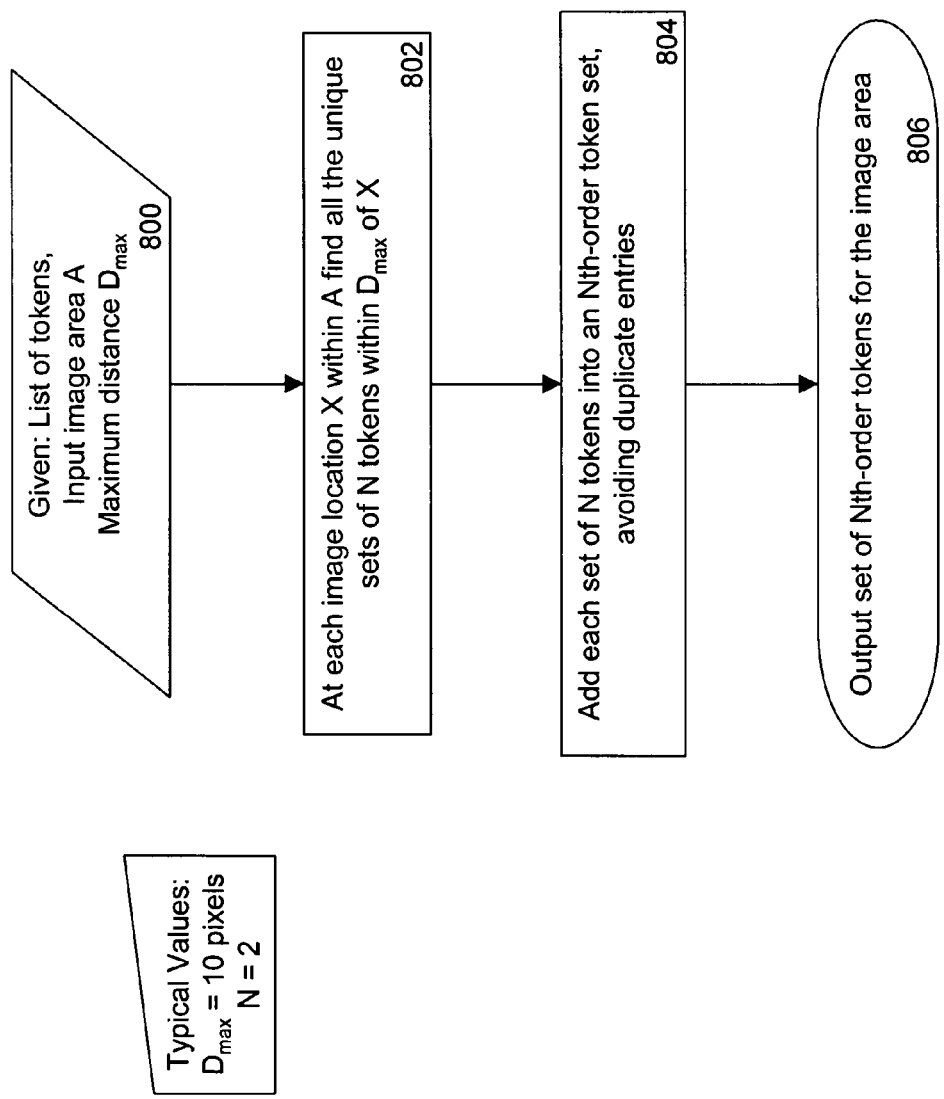
Figure 11A: Creating Nth-Order Tokens: Method 1

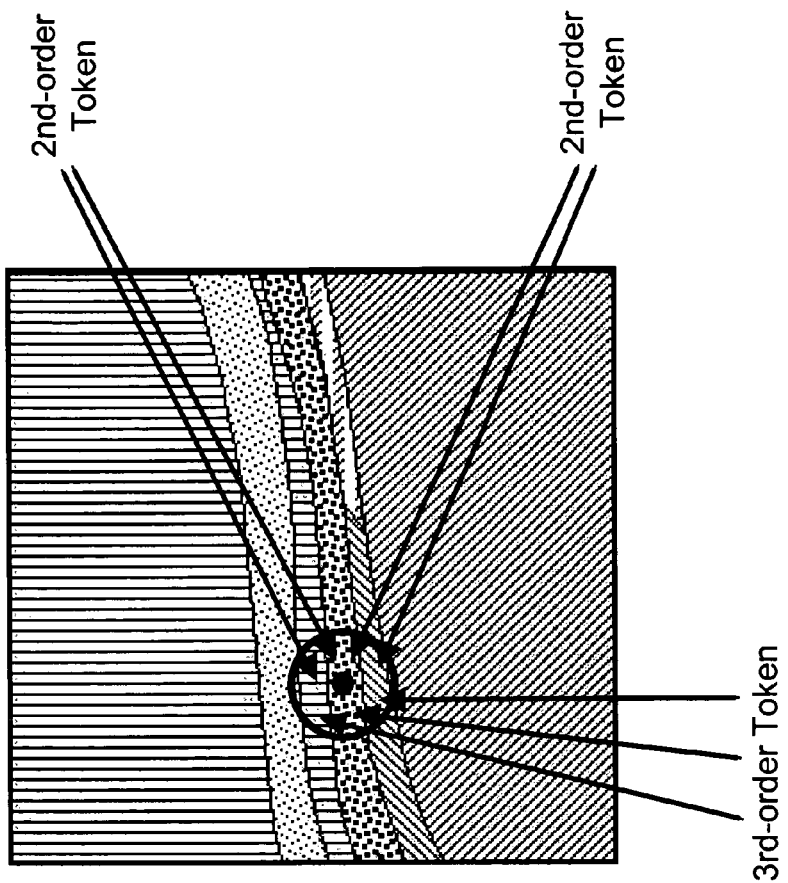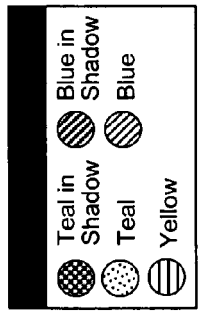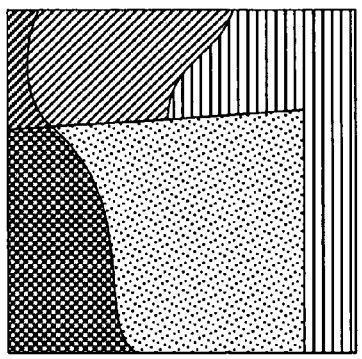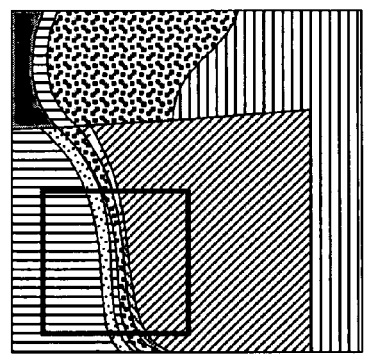
Figure 11AB: Creating Nth-Order Tokens: Method 1

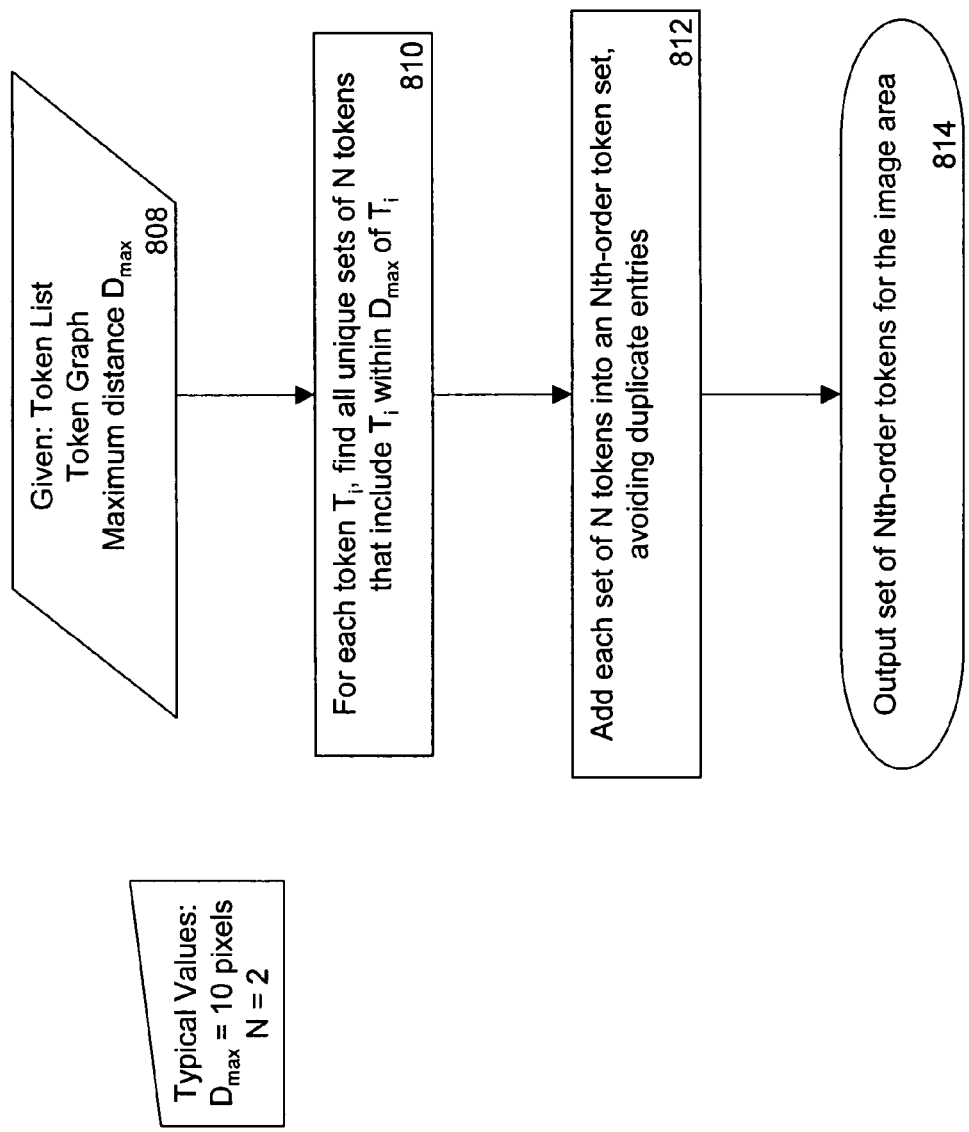
Figure 11B: Creating Nth-Order Tokens: Method 2

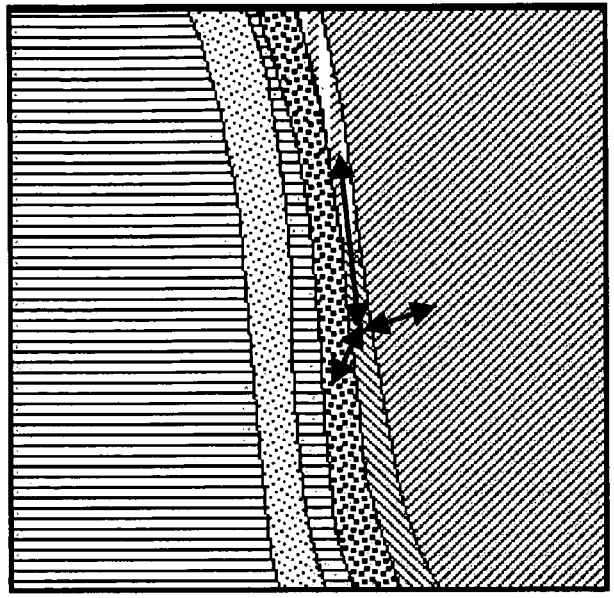
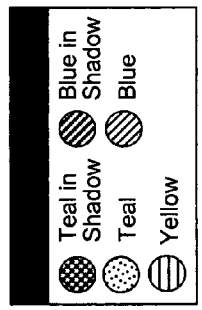
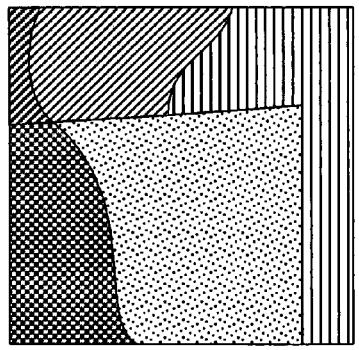
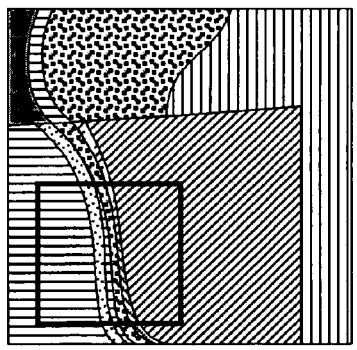
Figure 11BB: Creating Nth-Order Tokens: Method 2

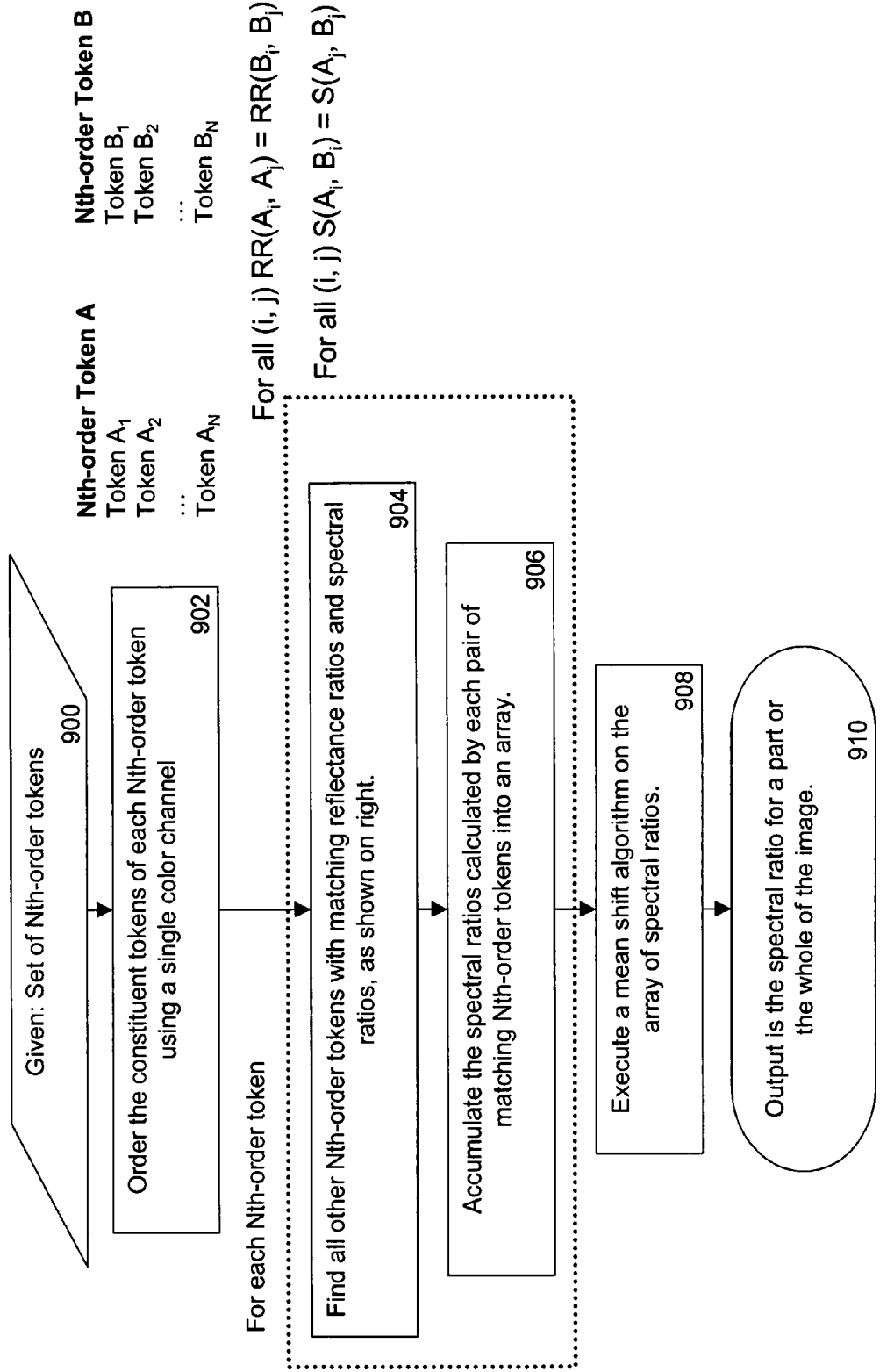
Figure 12: Identifying Local Spectral Ratio Using Nth-order Token Matching

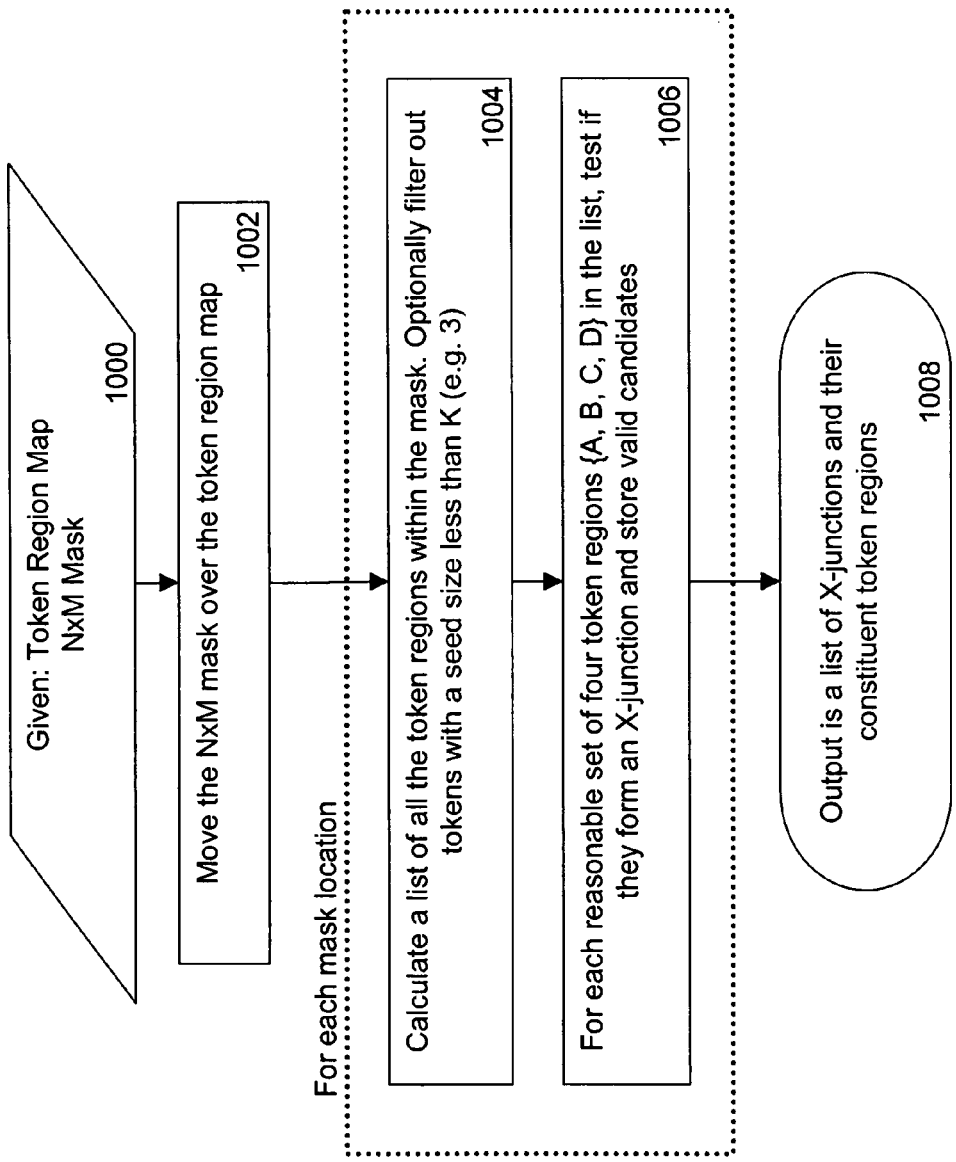
Figure 13: Identifying X-junctions on a Token Region Map

METHOD AND SYSTEM FOR IDENTIFYING ILLUMINATION FLUX IN AN IMAGE

This application claims the benefit of U.S. Provisional Patent Application No. 60/648,228, filed Jan. 27, 2005, and U.S. Provisional Patent Application No. 60/650,300, filed Feb. 3, 2005, which are hereby incorporated by reference.

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. Edge detection is a fundamental task in image processing because without accurate and correct detection of the edges of physical objects, no other processing of the image is possible. If a cast shadow is indistinguishable from the object casting the shadow, it would not be possible for the computer to recognize the object.

An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images.

SUMMARY OF THE INVENTION

The present invention provides a method and system comprising image techniques that accurately and correctly reflect and represent physical phenomena occurring in the visual world.

In a first exemplary embodiment of the present invention, an automated, computerized method is provided for determining illumination flux in an image. The method comprises the steps of performing dynamic sampling in preselected local areas of the image to determine spectral ratio information for the image at each of the preselected local areas, and utilizing the spectral ratio information to identify illumination flux.

In a second exemplary embodiment of the present invention, an additional automated, computerized method is provided for determining an illumination boundary in an image. The method according to the second exemplary embodiment of the present invention comprises the steps of identifying an X-junction in the image, determining a spectral ratio for an area of the image defined by the identified X-junction, and utilizing the spectral ratio to identify an illumination boundary.

In a third exemplary embodiment of the present invention, an automated, computerized method for determining illumination flux in an image comprises the steps of identifying spatio-spectral information for the image, utilizing the spatio-spectral information to calculate spectral ratio information, and utilizing the spectral ratio information to identify illumination flux.

In a fourth exemplary embodiment of the present invention, a computer system is provided. The computer system comprises a CPU and a memory storing an image file. Pursuant to a feature of the present invention, the CPU is arranged and configured to execute a routine to identify spatio-spectral information from the image, utilize the spatio-spectral information to calculate spectral ratio information, and utilize the calculated spectral ratio information to identify illumination flux in the image.

In a fifth exemplary embodiment of the present invention, an automated, computerized method for determining illumination information in an image comprises the steps of identifying spatio-spectral information for the image and utilizing the spatio-spectral information to calculate spectral ratio information for the image.

In a sixth exemplary embodiment of the present invention, an automated, computerized method for determining illumination information in an image comprises the steps of calculating spectral ratio information for the image, and utilizing the spectral ratio information for the image to identify illumination information for the image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3a is a flow chart for identifying token regions in the image file of FIG. 2, according to a feature of the present invention.

FIG. 3b is an original image used as an example in the identification of tokens.

FIG. 3c shows token regions in the image of FIG. 3a.

FIG. 4a is a flow chart for building a token region graph from the token regions identified in FIG. 3a, according to a feature of the present invention.

FIG. 4b shows token perimeters for the image of FIG. 3b.

FIG. 4c shows a token connection graph for the image of FIG. 3b.

FIG. 5a is a flow chart for identifying X-junctions in an image using the token region graph of FIG. 4a, according to a feature of the present invention.

FIG. 5b shows an X-junction within the image of FIG. 3b.

FIG. 6a is a flow chart for an X-junction testing sub-routine of the flow chart of FIG. 5.

FIG. 6b shows an image having an x-junction.

FIG. 7 is a flow chart for identifying a local spectral ratio using an X-junction of FIG. 5, according to a feature of the present invention.

FIG. 8 is a flow chart for identifying material and illumination edges using ratio matching, according to a feature of the present invention.

FIG. 9 is a flow chart for identifying X-junctions in an image using a fixed-sized mask.

FIG. 10 is a flow chart for identifying X-junctions in an image using stochastic sampling.

FIG. 11a is a flow chart of a first method for creating an Nth order token.

FIG. 11ab is an image showing Nth order tokens created using the method of FIG. 11a.

FIG. 11b is a flow chart of a second method for creating an Nth order token.

FIG. 11bb is an image showing Nth order tokens created using the method of FIG. 11b.

FIG. 12 is a flow chart for identifying a local spectral ratio using Nth order tokens created using one of the methods of FIGS. 11a and 11b.

FIG. 13 is a flow chart for an additional routine to identify X-junctions on a token region map, according to a feature of the present invention.

DETAILED DESCRIPTION OF THE PREFERRED EMBODIMENTS

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU can be implemented as a microprocessor embedded in a device such as, for example, the digital camera 14 or a robot. The CPU can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The present invention can also be utilized in connection with a grayscale image (a single band), utilizing a single panchromatic band. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, material object edge detection in the subject image. A fundamental observation underlying a basic discovery of the present invention, is that an image comprises two components, material and illumination. All changes in an image are caused by one or the other of these components. A method for detecting of one of these components, for example, illumination, provides a mechanism for distinguishing material or object geometry, such as object edges, from illumination.

What is visible to the human eye upon display of a stored image file 18 by the CPU 12, is the pixel color values caused by the interaction between specular and body reflection properties of material objects in, for example, a scene photographed by the digital camera 14 and illumination flux present at the time the photograph was taken. The illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region.

Based upon the fundamental observation of the present invention that an image comprises two components, material and illumination, the computer system 10 can be operated to differentiate between material aspects of the image such as, for example, object edges, and illumination flux through recognition of a spectral shift caused by the interplay between the incident illuminant and the ambient illuminant in the illumination. When one of material and illumination is known in an image, the other can be readily deduced. The spectrum for the incident illuminant and the ambient illuminant can be different from one another. A spectral shift caused by a shadow, i.e., a decrease of the intensity of the incident illuminant, will be substantially invariant over different materials present in a scene depicted in an image. Pursuant to a feature of the present invention, this spectral shift information is detected by determination of an illuminant ratio, or a spectral ratio formed by the interplay of the incident illuminant and the ambient illuminant. A spectral ratio is a ratio based upon a difference in color or intensities between two areas of a scene depicted in an image, which may be caused by different materials, an illumination change or both.

As a general algorithm for implementing the basic discovery of the present invention, pixel values from both sides of a boundary are sampled at, for example, three intensities or color bands, in long, medium and short wave lengths such as red, green and blue. If one side of the boundary is darker than the other side in all color bands, the color intensity shift is considered a possible illumination boundary. If any color band increases in intensity while the other color bands are decreasing, then the boundary must be a material object boundary because shadows only remove illumination. A shift from incident to ambient, as occurs in a shadow, cannot coincide with a brightening of any color band. In a monochromatic or grayscale image, intensity in a single band can be used.

After identification of a color intensity shift, a spectral ratio for the shift is determined. A spectral ratio can be defined in a number of ways such as, for example, B/D, B/(B−D) and D/(B−D), where B is the color on the bright side of the shift and D is the color on the dark side. The visual correctness of an identification of an illumination boundary using a spectral ratio is established through an analysis based upon a bi-illuminant dichromatic reflection model of an image, as disclosed in application Ser. No. 11/341,751, filed on even date herewith, entitled: "Bi-illuminant Dichromatic Reflection Model For Image Manipulation," now published as US 2007/0176940 on Aug. 2, 2007, which is hereby incorporated by reference.

In a preferred embodiment of the present invention, the spectral ratio S=D/(B−D) is utilized because it has been discovered during development of the present invention that the normalized value for the ratio D/(B−D) is invariant across different geometric orientations for a material object, and thus, the ratio remains constant across illumination boundaries for objects at different orientations. Moreover, the normalized value for the ratio D/(B−D) produced by a fully shadowed pixel and a penumbra pixel will be the same as the normalized value produced by a fully shadowed pixel and a fully lit pixel. These relationships are not exhibited by the normalized values of B/D and B/(B−D). Accordingly, the ratio D/(B−D) provides the optimum combination of accuracy and correctness.

$B_{red}$ is the red channel of a color measurement on the incident or bright side of the shift, while $D_{red}$ is the red channel value on the dark side. Similarly, $B_{green}$ and $B_{blue}$ represent the green and blue channel intensities on the bright side of the shift, respectively, and $D_{green}$ and $D_{blue}$ represent the green and blue intensities on the dark side. The spectral ratio for the shift therefore comprises an N dimensional vector, in our example, a three dimensional vector:

$$V=(D_{red}/(B_{red}-D_{red}), D_{green}/(B_{green}-D_{green}), D_{blue}/(B_{blue}-D_{blue})).$$

As discussed above, according to a feature of the present invention, the vector is normalized by dividing the vector by the scalar value of the vector length. A characteristic spectral ratio or illuminant ratio for the image is determined. Inasmuch as an illumination boundary is caused by the interplay between the incident illuminant and the ambient illuminant, spectral ratios throughout the image that are associated with illumination change, should be consistently and approximately equal, regardless of the color of the bright side or the material object characteristics of the boundary. Thus, if the spectral ratio in our analysis is approximately equal to the characteristic spectral ratio for the scene, the boundary would be classified as an illumination boundary.

To improve the accuracy and correctness of the characteristic ratio for an image, the spectral ratio information for illumination boundaries is determined on a local level, that is, an illuminant ratio is determined for each of several preselected local areas of a scene depicted in an image. An analysis of a boundary is then executed utilizing the spectral ratio for the specific location of the boundary within the image. The determination of locally relevant spectral ratios accommodates complexities that may be encountered in a real world image, for example, the interplay of several different sources of light in a room, inter-reflections, and so on.

According to a feature of the present invention, a local spectral ratio is automatically determined by the computer system 10, by a dynamic sampling of local areas of the image, to identify spatio-spectral features of an image, that is, features that comprise conditions that are indicative of illumination flux. An example of a spatio-spectral feature is an X-junction. An X-junction is an area of an image where a material edge and an illumination boundary cross one another. An X-junction is an optimal location for an accurate determination of an illuminant ratio.

According to a further feature of the present invention, a token analysis of an image is used to identify spatio-spectral features. A token is a connected region of an image wherein the pixels of the region are related to one another in a manner relevant to identification of spatio-spectral features. The pixels of a token can be related in terms of either homogeneous factors, such as, for example, close correlation of color among the pixels, or nonhomogeneous factors, such as, for example, differing color values related geometrically in a color space such as RGB space. The use of tokens rather than individual pixels reduces complexity and noise in image processing and provides a more efficient, less intense computational operation for the computer system 10.

In an exemplary embodiment of the present invention, a uniform token analysis is used to identify X-junctions in an image. A uniform token is a homogeneous token that comprises a connected region of an image with approximately constant pixel values (for example, within a range determined by the expected noise margin of the recording equipment or normal variations in materials) throughout the region. A $1^{st}$ order uniform token comprises a single robust color measurement among contiguous pixels of the image. The analysis can include an examination of token neighbor relationships indicative of spatio-spectral features of an image, as will be described in more detail below.

Referring now to FIG. 3a, there is shown a flow chart for identifying uniform token regions in the image file of FIG. 2, according to a feature of the present invention. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer >0, for example it can be set at set at 11 or 15 pixels.

At step 102, a seed test is begun. The CPU 12 selects a first pixel, i=(1, 1) for example, the pixel at the upper left corner of a first N×N sample. The pixel is then tested in decision block 104 to determine if the selected pixel is part of a good seed. The test can comprise a comparison of the color value of the selected pixel to the color values of a preselected number of its neighboring pixels as the seed, for example, the N×N array. If the comparison does not result in approximately equal values for the pixels in the seed, the CPU 12 increments the value of i (step 106), for example, i=(1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU then returns to the decision block 114. The routine of steps 114, 116, 118 is repeated until the queue is empty. At that time, all of the pixels forming a token in the current region will have been identified and marked in the region map.

When the queue is empty, the CPU proceeds to step 120. At step 120, the CPU increments the region ID for use with identification of a next token. The CPU then returns to step 106 to repeat the routine in respect of the new current token region.

Upon arrival at $N=N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions in the image of FIG. 3a. The token regions are color coded to illustrate the token makeup of the image of FIG. 3b, including penumbra regions between the full color blue and teal areas of the image and the shadow of the colored areas.

The CPU 12 thereafter commences a routine for building a token graph that can be used to identify X-junctions in the image. Referring to FIG. 4a, there is shown a flow chart for building a token region graph from the token regions identified through execution of the routine shown in FIG. 3a, according to a feature of the present invention.

Initially, the CPU 12 is given the list of tokens identified in the previous routine, and a value for a maximum distance D between tokens (step 200). In an exemplary embodiment of the present invention, D=20 pixels. In step 202, the CPU 12 traverses pixel information for each token to identify all perimeter pixels of all tokens. FIG. 4b shows token perimeter pixels for the image of FIG. 3b. The CPU then proceeds to step 204.

In step 204, the CPU 12 selects a token region from the token list and identifies the selected token, for purposes of the routine, as a current token, A. For each perimeter pixel in token A, the CPU 12 finds the closest perimeter pixel in every other token within the maximum distance D from the perimeter of the token A (step 206).

In step 208, the CPU 12 builds a list of tokens that are neighbors to token A by compiling all token IDs found in the previous pixel matching step 206. In step 210, the CPU 12 stores the list of neighbors for token A, and proceeds to decision block 212. In the decision block 212, the CPU 12 checks whether it is at the end of the token list. If not, the CPU 12 returns to step 204, and sets token A to a next token on the token list, and repeats steps 206-212 for the next token. If the CPU 12 is at the end of the token list, the CPU proceeds to step 214, where the CPU 12 returns the token graph for the image. FIG. 4c shows a token connection graph for a portion of the image of FIG. 3b.

Upon completion of the token graph, the CPU 12 proceeds to the routine of FIG. 5a, to identify X-junctions in the image using the token region graph. For each token in the token list, the CPU 12 performs iterations through neighbor relationships to identify a region where spectral ratios indicate a crossing of illumination and material object boundaries.

As an input (step 300) the CPU 12 receives the token list T, and the token graph G, prepared by the CPU 12 during execution of the routines of FIGS. 3a and 4a, respectively. In a main iteration through all tokens $T_j$ in T (the token list), the CPU 12 performs sub-iterations through neighbors, as will appear. In step 302, the CPU 12 selects a token A from the token list, $T_j=A$ (a current token), and then selects all of the neighbors for A, $X=G_A$ (from the token graph).

As a first sub-iteration for the current token A, the CPU 12 traverses all the neighbors $X_j$ in X, found in step 302. In step 304, the CPU 12 considers, in turn, each neighbor, set as $B=X_j$. In a decision block 306, the CPU 12 tests for the current token neighbor B, whether all of the color bands of color A>all of the color bands of color B? If color A is not greater than color B in all color bands, the CPU 12 returns to step 304 to select a next neighbor B from X ($G_A$, the neighbors of A).

If color A is greater than color B, the CPU 12 proceeds to step 308 to select token neighbors of B from the token graph, set as $Y=G_B$. The CPU 12 then proceeds to the next sub-iteration over all the neighbors Yk in Y. In step 310, the CPU 12 considers, in turn, each neighbor, set as C=Yk. In a decision block 312, the CPU 12 tests whether A=C. If A does equal C, the CPU 12 returns to step 310 to select a next neighbor token C from Y ($G_B$, the neighbors of B).

If C is a different token than A, the CPU proceeds to step 314 to select token neighbors of C, set as $Z=G_C$. The CPU 12 then proceeds to the final sub-iteration over all the neighbors $Z_I$ in Z. In step 316, the CPU 12 considers, in turn, each neighbor, set as $D=Z_I$. In a decision block 318, the CPU tests whether D is in X and if D!=B. If no, the CPU 12 returns to step 316 to select a next neighbor token D from Z ($G_C$, the neighbors of C).

If the test of block 318 results in a yes result, the CPU 12 proceeds to step 320 to test whether the token neighbor set {A, B, C, D}, identified in an iteration of the routine of FIG. 5a, meets X-junction criteria. FIG. 5b shows the image of FIG. 3b with a token neighbor set {A, B, C, D}. The hypothesis of the iteration execution is that token set {A, B, C, D} embodies certain neighbor relationships, or spatio-spectral conditions, indicative of an X-junction, for example, tokens A and B comprise a material 1, with A being a lit version of B, and that tokens D and C comprise a material 2, with D being a lit version of C. There are several tests that are performed to validate the hypothesis.

FIG. 6a shows a flow chart for the X-junction testing subroutine, step 320 of the flow chart of FIG. 5. In step 326 the token neighbor set {A, B, C, D} is set as the starting point of the routine. As noted, the hypothesis, shown in the image of FIG. 6b, is that A and B are the same material 1, and that D and C are the same material 2 (328), and that B and C are in shadow.

In a first test, step 330, the CPU 12 determines whether the pixels of token A>the pixels of token B and the pixels of token D>the pixels of token C, in each color band. The colors B and C are multiplied by a factor, f, which is a scalar value greater than 1. In step 332, it is determined whether the bright measurements for A and D tokens are brighter than a minimum threshold.

The next test (step 334) comprises a determination of whether each of the bright tokens A and D, are significantly different in a color space, for example, in an RGB space. In this regard, a determination is made as to whether the color space distance (A, D)>threshold.

In step 336 the CPU 12 determines whether the reflectance ratio between A and D is approximately equal to the reflectance ratio for B and C. The bounded version of the ratios can be used, $R_1=(A-D)/(A+D)$, and $R_2=(B-C)/(B+C)$, with $R_1=R_2$. In step 338, the spectral ratios $S_1=B/(A-B)$ and $S_2=C/(D-C)$ are compared to determine if they are similar to one another (within a predetermined difference).

In step 340, the CPU 12 determines if the spectral ratios fit an a priori model of a reasonable illuminant. Variations on the constraints can include, for example, requiring the dark measurements for the B and C tokens to be less than a percentage of the corresponding bright measurement. Moreover, the CPU 12 can test the spectral ratios determined in step 338 for saturation levels. Saturation is defined as saturation=1−(minimum color band/maximum color band). An upper boundary can be established for the spectral ratio, in terms of saturation, for example, any spectral ratio with a saturation >0.9 is considered to be unreasonable. If all of the above constraints are met, the X-junction criteria are considered to be satisfied (step 342).

In the event a token set {A, B, C, D} fails the X-junction tests of step 320, the CPU 12, in decision block 322, returns to step 316 to select a next neighbor D from Z ($G_C$, the neighbors of C). If the token set {A, B, C, D} passes, the CPU 12 proceeds to step 324 to mark the token set {A, B, C, D} as a valid X-junction. The CPU then returns to step 302 to select a next token (other than the set {A, B, C, D}) from the token list T, for an X-junction analysis.

Referring now to FIG. 7, there is shown a flow chart for identifying a local spectral ratio using an X-junction, according to a feature of the present invention. The CPU 12 is given an image file 18 and X-junction parameters in step 400. The CPU 12 then proceeds to step 402, which comprises the performance of the processes of FIGS. 3-5, throughout the given image to identify all X-junctions within the image.

Upon completion of step 402, the CPU proceeds to step 404 to calculate a spectral ratio for each bright/dark pixel pair in each X-junction, and store the results in a memory array. In step 406, the CPU executes a mean shift algorithm on the array of spectral ratios. The mean shift algorithm can comprise, for example, an algorithm described in "Mean shift analysis and applications," Comaniciu, D.; Meer, P.; Computer Vision, 1999, The Proceedings of the Seventh IEEE International Conference on; Volume 2, 20-27 Sep. 1999; Pages 1197-1203. The output of execution of the mean shift algorithm (step 408) is a spectral ratio for all or a specific local region of the image. The execution of step 406 can include a survey of values for the spectral ratios throughout the image.

If the spectral ratios vary by an amount>a threshold variance, a local approach will be implemented for the spectral ratio information used in determining illumination boundaries. That is, a mean shift value for a specific X-junction will be used as the spectral ratio when the CPU 12 determines illumination boundaries in the region of the image near the specific X-junction. If all of the spectral ratios for the entire image vary by less than the threshold variance, a global approach can be used with the same mean shift spectral ratio used in all illumination boundary determinations.

Referring now to FIG. 8, there is shown a flow chart for identifying material and illumination using ratio matching, according to a feature of the present invention. More specifically, the routine of FIG. 8 identifies illumination flux comprising an illumination boundary. In step 500, the CPU 12 is given spectral ratio information for an image determined through execution of the routine of FIG. 7, and standard brightness edge boundary segment information for the image. For each brightness edge segment of the image, in step 502, the CPU 12 traverses the edge by selecting pixel or token pairs, each pair comprising a pixel or token from the bright side of an edge segment and a pixel or token from the dark side of the edge segment.

In step 504, for each pair of pixels or tokens, the CPU 12 calculates a spectral ratio, S=Dark/(Bright−Dark) and accumulates the S values for all the pairs along the corresponding edge segment. In step 506, the CPU 12 decides if the accumulated set of S values for an edge segment matches the given spectral ratio information. As discussed above, the given spectral ratio information can be a global value for the image or a local value for the part of the image where the edge segment is located. If there is a match of spectral ratios, the CPU 12 marks the edge segment as an illumination boundary (step 508). If there is no match, the CPU 12 marks the edge as a material edge (step 510).

Referring now to FIG. 9, there is shown a flow chart for an alternative routine for identifying X-junctions in an image, using a fixed-sized mask. An image file 18 is accesed by the CPU 12 from memory 16 (step 600). A mask is defined as an N×M array of pixels (which can be a square or N×N array of pixels) (602) to be used in an analysis of the image. The mask is placed over an area of the image. In step 604, the CPU 12 selects four color measurements from within the area of the mask, to approximate points within an X-junction. The four points can be designated as a set {A, B, C, D}, as shown in FIG. 6b. In step 606, the set {A, B, C, D} is tested for the X-junction constraints using the X-junction testing sub-routine of the flow chart of FIG. 6a.

After execution of the testing sub-routine, the CPU 12 proceeds to a decision block 608. In the decision block, the CPU 12 determines whether the set {A, B, C, D} passed the X-junction test. If yes, the CPU 12 marks the center pixel between the points of the set {A, B, C, D} as an X-Junction (step 610) and proceeds to step 612. If no, the CPU proceeds directly to step 612.

In step 612, the CPU 12 moves the mask to a new location over the image, and proceeds to step 604, to begin the routine once again over a new area of the image. The CPU 12 continues to move the mask until the entire image has been tested. In step 614, an optional additional routine is provided. In an image, there can be penumbra of many different sizes. Some shadows have a very sharp penumbra, while others project a fuzzy penumbra. If the routine of steps 604-612 uses a mask of, for example, 20 pixels by 20 pixels, that may be smaller than the width of a fuzzy penumbra. To handle this situation, and to insure identification of all X-junctions in an image, the routine of steps 604-612 can be rerun using either a larger mask, a mask of different orientation or shape, or a same-sized mask used with the image scaled to a smaller size.

A running of a same-sized mask on a smaller image is known as a scale-space analysis. In general, it is more efficient to make an image smaller than to increase mask size, so a scale-space analysis is preferred. In the step 614, the image is made smaller (a subsample), for example, cut in half. This is done by taking each 2 pixel by 2 pixel block of pixels, calculate the average color value of the block, and make it a single pixel in the new reduced version of the image. Thereafter, steps 604-612 are repeated for the reduced image.

FIG. 10 shows a flow chart for identifying X-junctions in an image using stochastic sampling. The CPU 12 is given an image, a selected area of the image, a sampling method, a maximum number of sampling routines N for the selected area, and an iteration number, i=0 (step 700). In step 702, the CPU 12 executes the sampling method to select a set of color values {A, B, C, D} from within the area of the image being examined. In step 704, the set {A, B, C, D} is tested for the X-junction constraints using the X-junction testing sub-routine of the flow chart of FIG. 6a.

After execution of the testing sub-routine, the CPU 12 proceeds to a decision block 706. In the decision block, the CPU 12 determines whether the set {A, B, C, D} passed the X-junction test. If no, the CPU 12 proceeds to a decision block 708 to test whether the iteration value, i, is less than N, the maximum number of iterations to be performed in the selected area. If no, the CPU 12 proceeds to step 710 to reset the iteration value, i, to 0, and continue to a next selected area of the image. The CPU 12 then proceeds back to step 702 to repeat the routine for the new area.

If the test for i<N is yes, the CPU 12 proceeds to step 712 to increment the value of i for the same sample area, and return to step 702 to repeat a sampling of the same area. If the result of the X-junction test is yes (706), the CPU 12 proceeds to step 714 to mark a center pixel of the area as an X-junction. The CPU 12 then proceeds to step 710, as described above. In step 716, the subsample routine of step 614 of FIG. 9 is carried out to repeat the stochastic sampling on a reduced sized image.

Pursuant to another feature of the present invention, spatio-spectral features of an image are determined by directly using neighbor relationships of tokens. An Nth order token is a set of N $1^{st}$ order tokens that are different colors, as measured in a selected color space, for example, RGB, hue or chromaticity, and are near to one another in the image. As an example, a red first order token and a blue first order token adjacent to one another in an image could form a second-order token.

FIG. 11a shows a flow chart of a first method for creating an Nth order token. The CPU 12 is given a list of tokens, for example, as identified through execution of the routine of FIG. 3a, an input image area A and a maximum distance $D_{max}$, which could be set at 10 pixels (step 800). In step 802, the CPU 12, for each $1^{st}$ order token within the image area A, selects an image location or pixel X=p(i, j) and then finds all unique sets of N tokens, that is, for example, all tokens of different color, withing $D_{max}$ of each location X. In step 804, the CPU 12 adds each set of N tokens found in step 802, into an Nth order token set, checking for duplicates. In step 806, the CPU 12 outputs the Nth order token sets for the image area. FIG. 11ab is an image showing Nth order tokens created using the method of FIG. 11a.

FIG. 11b shows a flow chart of a second method for creating an Nth order token. In the second method, the CPU 12 utilizes a token graph created, for example, through execution of the routine of FIG. 4a. In step 808, the CPU 12 is given a token list for an image file 18, the corresponding token graph and a maximum distance, $D_{max}$. In step 810, for each token $T_i$ in the token list, the CPU 12 finds all unique sets of tokens within $D_{max}$ of $T_i$ from the token graph. In step 812, the CPU adds each set of N tokens found in step 810, into an Nth order token set, checking for duplicates. In step 814, the CPU 12 outputs the Nth order token sets for the image area. FIG. 11bb is an image showing Nth order tokens created using the method of FIG. 11b.

Pursuant to yet another feature of the present invention, the Nth order tokens created via execution of one of the methods of FIGS. 11a and 11b are used to identify local spectral ratios for an image. Once again spatio-spectral features are examined to ascertain characteristic spectral ratio information indicative of illumination flux. In this instance, the spatio-spectral features comprise reflection ratio and spectral ratio relationships between neighbor tokens of Nth order tokens. These relationships are examined by the CPU 12.

Referring to FIG. 12, there is shown a flow chart for identifying a local spectral ratio using Nth order tokens. In step 900, a set of Nth order tokens for an image file 18 is given as a start to the CPU 12. The CPU 12 places the uniform tokens within an Nth order token in an order, for example, according to intensity in a single color channel (step 902). As shown in FIG. 12, adjacent the step 902, a sample order of tokens within each of Nth order token A and Nth order token B is shown. The Nth order token A comprises tokens ordered tokens $A_1, A_2, \ldots A_N$ and Nth order token B comprises ordered tokens $B_1, B_2, \ldots B_N$. Pursuant to a feature of the present invention, for each Nth order token, the CPU 12 operates to find all other Nth order tokens with matching reflectance ratios and spectral ratios (step 904).

Adjacent to step 904 (FIG. 12) is shown an algorithm for comparing reflectance ratios and spectral ratios for the token pair A, B. For each pair of tokens $A_i$, $A_j$ in the Nth order token A and a corresponding pair of tokens $B_i$, $B_j$ in the Nth order token B, the CPU 12 determines equality relationships between the reflectance ratios and spectral ratios for the pairs. The reflectance ratios can be determined using the bounded version of the ratios: $R(A_i, A_j)=(A_i-A_j)/(A_i+A_j)$, and $R(B_i, B_j)=(B_i-B_j)/(B_i+B_j)$, to determine if $R(A_i, A_j)=R(B_i, B_j)$. Similarly, the spectral ratios can be calculated using the preferred form of the spectral ratio: $S(A_i, B_i)=(Dark\ one\ of\ (A_i, B_i)/Bright\ one\ of\ (A_i, B_i)-Dark\ one\ of\ (A_i, B_i))$, and $S(A_j, B_j)=(Dark\ one\ of\ (A_j, B_j)/Bright\ one\ of\ (A_j, B_j)-Dark\ one\ of\ (A_j, B_j))$, to determine if $S(A_i, B_i)=S(A_j, B_j)$. The assumption of the analysis and relationship determination is that one of the Nth order tokens is in shadow and the other one of the Nth order tokens is lit.

In step 906, the CPU 12 accumulates all spectral ratios from pairs of Nth order tokens that match, that is, demonstrate equality in step 904 and lists them in an array. The CPU then executes a mean shift algorithm on the array of accumulated spectral ratios (step 908) and outputs the result as a characteristic spectral ratio for a local area or a whole of the image (step 910).

A characteristic spectral ratio can be determined using more than one of the methods described above. For example, each of X-junctions and Nth order tokens can be analyzed to determine local spectral ratios. The accumulated ratios can be weighted by empirical experience of reliability, and subject to a mean shift algorithm to extract a characteristic spectral ratio.

Referring now to FIG. 13, there is shown a flow chart for an additional routine to identify X-junctions on a token region map, according to a feature of the present invention. In step 1000, the CPU 12 is given a token region map, as for example, as generated through execution of the routine of FIG. 4a, and an N×M mask, for example, a 20 pixel×20 pixel mask. In step 1002, the CPU 12 moves the mask over the token region map.

For each mask location, the CPU 12 calculates a list of all tokens within the mask, filtering out tokens with a seed size of K, for example, 3 pixels (step 1004). The CPU 12 then selects from the list of tokens, each set of four reasonable adjacent tokens {A, B, C, D}, as shown in the token region map (step 1006). The reasonableness of a set {A, B, C, D} is determined by the CPU 12 by measuring the brightness of each token in the set, to determine if one of the tokens is bright enough to be a bright region (based upon a preselected level of brightness). That token is then labeled A. Then the tokens of the set other than A, are measured to determine if any of the remaining tokens are darker than A in all color bands. Such a token is labeled B. Thereafter, the CPU 12 measures the remaining tokens for brightness greater than the preselected level of brightness, and having a color different from A. That token is labeled D. Then the remaining token is tested to determine if it is darker than D in all color bands. If yes, the remaining token is labeled C.

A test, such as the routine of FIG. 6a, is executed by the CPU 12 to determine whether the set {A, B, C, D} is an X-junction. In step 1008, the CPU 12 outputs a list of X-junctions identified through execution of steps 1004-1006, for each mask location.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for determining illumination in an image, comprising the steps of:
   a computer executing the following steps:
   automatically identifying spatio-spectral features in the image indicative of a spectral shift between an incident illuminant and an ambient illuminant;
   analyzing the identified spatio-spectral features of the image to determine a characteristic spectral ratio for the image; and
   utilizing the characteristic spectral ratio to identify an illumination boundary in the image.

2. The method of claim 1 wherein the steps of automatically identifying spatio-spectral features in the image indicative of a spectral shift between an incident illuminant and an ambient illuminant, and analyzing the identified spatio-spectral features of the image to determine a characteristic spectral ratio for the image are carried out by identifying token regions in the image and performing an analysis of token region neighbor relationships to determine the characteristic spectral ratio.

3. The method of claim 2 wherein the step of performing an analysis of token region neighbor relationships is carried out to identify X-junctions in the image, and utilizing the X-junctions to determine the characteristic spectral ratio.

4. The method of claim 3 wherein the step of performing an analysis of token region neighbor relationships to identify X-junctions in the image is carried out by performing a series of iterative selections of token neighbors and performing tests of neighbor characteristics related to X-junction parameters.

5. The method of claim 2 wherein the step of performing an analysis of token region neighbor relationships is carried out by generating a token region graph.

6. The method of claim 5 wherein the step of generating a token region graph is carried out by identifying perimeter pixels of each token region, for each perimeter pixel, finding a closest perimeter pixel for each other token region within a maximum distance, and compiling a list of all token regions corresponding to the pixels found within the maximum distance in the finding step.

7. The method of claim 2 wherein the step of identifying token regions in the image is carried out by selecting a seed region of pixels, testing the pixels of the seed region for similarity of color characteristics, and, in the event of a good seed determination, identifying pixel neighbors of the pixels of the seed region having similarity of color characteristics.

8. The method of claim 2 wherein the step of performing an analysis of token neighbor relationships is carried out by identifying Nth order tokens and comparing reflection ratio and spectral ratio relationships between neighbor tokens of the Nth order tokens to determine the characteristic spectral ratio.

9. The method of claim 1 wherein the characteristic spectral ratio comprises S=Dark/(Bright−Dark).

10. The method of claim 9 wherein the characteristic spectral ratio comprises a normalized value of S.

11. The method of claim 1 wherein the step of utilizing the characteristic spectral ratio to identify an illumination boundary is carried out by comparing a spectral ratio for a selected pair of color values, one on each side an image boundary, to the characteristic spectral ratio, to determine a match.

12. The method of claim 1 wherein the step of identifying spatio-spectral features in the image caused by a spectral shift between an incident illuminant and an ambient illuminant is carried out in each of a plurality of preselected local areas of the image.

13. The method of claim 1 wherein the steps of automatically identifying spatio-spectral features in the image indicative of a spectral shift between an incident illuminant and an ambient illuminant, and analyzing the identified spatio-spectral features of the image to determine a characteristic spectral ratio for the image are carried out by identifying an X-junction and utilizing the X-junction to determine the characteristic spectral ratio.

14. The method of claim 13 wherein the step of identifying an X-junction is carried out by using a fixed sized mask to analyze pixels of the image for X-junction constraints.

15. The method of claim 13 wherein the step of identifying an X-junction is carried out by using stochastic sampling.

16. A computer system, comprising:
   a CPU, and
   a memory storing an image file containing an image;
   the CPU is arranged and configured to execute a routine to automatically identify spatio-spectral features in the image indicative of a spectral shift between an incident illuminant and an ambient illuminant, analyze the identified spatio-spectral features of the image to determine a characteristic spectral ratio for the image and utilize the characteristic spectral ratio to identify an illumination boundary in the image.

17. The computer system of claim 16 wherein operation of the CPU to automatically identify spatio-spectral features in the image indicative of a spectral shift between an incident illuminant and an ambient illuminant, and analyze the identified spatio-spectral features of the image to determine a characteristic spectral ratio for the image is carried out by operating the CPU to identify token regions in the image and to perform an analysis of token region neighbor relationships to determine the characteristic spectral ratio.

18. The computer system of claim 17 wherein operation of the CPU to perform an analysis of token region neighbor relationships is carried out by operation of the CPU to identify X-junctions in the image, and to utilize the X-junctions to determine the characteristic spectral ratio.

19. The computer system of claim 18 wherein operation of the CPU to perform an analysis of token region neighbor relationships to identify X-junctions in the image is carried out by operating the CPU to perform a series of iterative selections of token neighbors and to perform tests of neighbor characteristics related to X-junction parameters.

20. The computer system of claim 17 wherein operation of the CPU to perform an analysis of token region neighbor relationships is carried out by operating the CPU to generate a token region graph.

21. The computer system of claim 20 wherein operation of the CPU to generate a token region graph is carried out operation of the CPU to identify perimeter pixels of each token region, for each perimeter pixel, to find a closest perimeter pixel for each other token region withing a maximum distance, and to compile a list of all token regions corresponding to the pixels found within the maximum distance in the finding step.

22. The computer system of claim 17 wherein operation of the CPU to identify token regions in the image is carried out by operating the CPU to select a seed region of pixels, test the pixels of the seed region for similarity of color characteristics, and, in the event of a good seed determination, identify pixel neighbors of the pixels of the seed region having similarity of color characteristics.

23. The computer system of claim 17 wherein operation of the CPU to perform an analysis of token neighbor relationships is carried out operating the CPU to identify Nth order tokens and to compare reflection ratio and spectral ratio relationships between neighbor tokens of the Nth order tokens to determine the characteristic spectral ratio.

24. The computer system of claim 16 wherein the characteristic spectral ratio comprises S=Dark/(Bright−Dark).

25. The computer system of claim 24 wherein the characteristic spectral ratio comprises a normalized value of S.

26. The computer system of claim 16 wherein operation of the CPU to utilize the characteristic spectral ratio to identify an illumination boundary is carried out by operating the CPU to compare a spectral ratio for a selected pair of color values, one on each side of an image boundary, to the characteristic spectral ratio, to determine a match.

27. The computer system of claim 16 wherein operation of the CPU to identify spatio-spectral features in the image indicative of a spectral shift between an incident illuminant and an ambient illuminant is carried out in each of a plurality of preselected local areas of the image.

28. The computer system of claim 16 wherein operation of the CPU to automatically identify spatio-spectral features in the image indicative of a spectral shift between an incident illuminant and an ambient illuminant, and to analyze the identified spatio-spectral features of the image to determine a characteristic spectral ratio for the image are carried out by operation of the CPU to identify an X-junction and to utilize the X-junction to determine the characteristic spectral ratio.

29. The computer system of claim 28 wherein operation of the CPU to identify an X-junction is carried out by operating the CPU to use a fixed sized mask to analyze pixels of the image for X-junction constraints.

30. The computer system of claim 28 wherein operation of the CPU to identify an X-junction is carried out by operating the CPU to use stochastic sampling.

31. A computer program product, disposed on a computer readable media, the product including computer executable process steps operable to control a computer to:
provide an image file depicting an image, in a computer memory;
automatically identify spatio-spectral features in the image indicative of a spectral shift between an incident illuminant and an ambient illuminant;
analyze the identified spatio-spectral features of the image to determine a characteristic spectral ratio for the image; and
utilize the characteristic spectral ratio to identify an illumination boundary in the image.

32. The computer program product of claim 31 wherein the process steps to control the computer to automatically identify spatio-spectral features in the image indicative of a spectral shift between an incident illuminant and an ambient illuminant, and analyze the identified spatio-spectral features of the image to determine a characteristic spectral ratio for the image are carried out by process steps to control the computer to identify token regions in the image and to perform an analysis of token region neighbor relationships to determine the characteristic spectral ratio.

33. The computer program product of claim 32 wherein the process step to control the computer to perform an analysis of token region neighbor relationships is carried out by a process step to control the computer to identify X-junctions in the image, and to utilize the X-junctions to determine the characteristic spectral ratio.

34. The computer program product of claim 33 wherein the process step to control the computer to perform an analysis of token region neighbor relationships to identify X-junctions in the image is carried out by process steps to control the computer to perform a series of iterative selections of token neighbors and to perform tests of neighbor characteristics related to X-junction parameters.

35. The computer program product of claim 32 wherein the process step to control the computer to identify token regions in the image is carried out by a process step to control the computer to select a seed region of pixels, test the pixels of the seed region for similarity of color characteristics, and, in the event of a good seed determination, identify pixel neighbors of the pixels of the seed region having similarity of color characteristics.

36. The computer program product of claim 31 wherein the process step to control the computer to utilize the characteristic spectral ratio to identify an illumination boundary is carried out by a process step to control the computer to compare a spectral ratio for a selected pair of color values, one on each side of an image boundary, to the characteristic spectral ratio, to determine a match.

37. The computer program product of claim 31 wherein the process steps to control the computer to automatically identify spatio-spectral features in the image indicative of a spectral shift between an incident illuminant and an ambient illuminant, and analyze the identified spatio-spectral features of the image to determine a characteristic spectral ratio for the image are carried out by process steps to control the computer to identify an X-junction and to utilize the X-junction to determine the characteristic spectral ratio.

38. The computer program product of claim 37 wherein the process step to control the computer to identify an X-junction is carried out by a process step to control the computer to use a fixed sized mask to analyze pixels of the image for X-junction constraints.

39. The computer program product of claim 37 wherein the process step to control the computer to identify an X-junction is carried out by a process step to control a computer to use stochastic sampling.

40. The computer program product of claim 31 wherein the process step to control the computer to analyze the identified spatio-spectral features of the image to determine a characteristic spectral ratio for the image is carried out by a process step to control the computer to determine a characteristic spectral ratio for each of a plurality of preselected local areas of the image.

* * * * *